(12) United States Patent
Sherwani et al.

(10) Patent No.: US 11,130,061 B2
(45) Date of Patent: Sep. 28, 2021

(54) SERVER-BASED GENERATION OF A HELP MAP IN A VIDEO GAME

(71) Applicant: SONY INTERACTIVE ENTERTAINMENT INC., Tokyo (JP)

(72) Inventors: Adil Ahmed Sherwani, Oakland, CA (US); Mischa G. Stephens, San Francisco, CA (US); Karthik Anandh Govindaraj, Fremont, CA (US); Nitin Y. Mohan, San Francisco, CA (US); Oscar Michael Sanchez, San Bruno, CA (US); Derek Andrew Parker, South San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 45 days.

(21) Appl. No.: 16/687,372

(22) Filed: Nov. 18, 2019

(65) Prior Publication Data

US 2021/0146249 A1 May 20, 2021

(51) Int. Cl.
*A63F 13/67* (2014.01)
*A63F 13/5375* (2014.01)

(52) U.S. Cl.
CPC .......... *A63F 13/5375* (2014.09); *A63F 13/67* (2014.09)

(58) Field of Classification Search
CPC .............................. A63F 13/67; A63F 13/5375
See application file for complete search history.

(56) References Cited

U.S. PATENT DOCUMENTS

| | | | |
|---|---|---|---|
| 8,260,728 B1 | 9/2012 | Walsh et al. | |
| 2003/0216177 A1* | 11/2003 | Aonuma | A63F 13/10 463/32 |
| 2011/0281648 A1 | 11/2011 | Weising | |
| 2013/0005471 A1 | 1/2013 | Chung et al. | |
| 2016/0266740 A1* | 9/2016 | Glasgow | G06Q 10/101 |
| 2017/0328724 A1* | 11/2017 | Lobo | G01C 21/3446 |
| 2019/0232169 A1 | 8/2019 | Benedetto et al. | |

OTHER PUBLICATIONS

PCT/US2020/057123 , "International Search Report and Written Opinion", dated Jan. 15, 2021, 15 pages.

* cited by examiner

*Primary Examiner* — James S. McClellan
(74) *Attorney, Agent, or Firm* — Kilpatrick Townsend & Stockton LLP

(57) ABSTRACT

Techniques for improving a graphical user interface are described. In an example, a computer system receives event data from a plurality of user devices. Each event data includes an identifier of an activity in a video game, completion data indicating completion of the activity, and location data indicating where the activity was completed in the video game. The identifier can be predefined in program code of the video game. The evet data can be received based on an execution of the program code. The event data is processed to determine where the likely location for completing the activity in the video game. This likely location is shown as a graphical user interface element in a map.

20 Claims, 16 Drawing Sheets

SERVER-BASED GENERATION OF A HELP MAP IN A VIDEO GAME

BACKGROUND

Video games are available on different computing devices. For example, a user operates a video game console and a mobile device to play a first video game and a second video game, respectively. In addition, video games are available from different sources. For example, the video game console is operable to play multiple video games from two or more different video game developers.

Given the increasing number of video games and their availability on different computing devices and from different sources, the user experience typically changes. For example, the way game play help may be sought can vary significantly between video games. In addition, the way a particular part of a video game is surfaced on a computing device, as being available for playing, can be unique to the particular video game.

Hence, the user experience may not be common between the video game players. There is a need for improving the user experience such that, regardless of the underlying video games, some commonality in video game functionalities becomes possible.

BRIEF SUMMARY

Techniques for improving a user video game experience are described. In an example, a computer system is used for presentation of video game-related information. The computer system includes one or more processors and one or more non-transitory computer readable storage media (e.g., one or more memories) storing instructions that, upon execution by the one or more processors, cause the computer system to perform operations.

In an example, the operations include receiving an activity identifier of an activity completed by a first video game player in a video game and location information of a location within the video game where the activity was completed. The activity identifier is predefined in program code of the video game. The activity identifier and the location information are received based on an execution of the program code. The operations also include storing the activity identifier and the location information in a data store. The operations also include determining, based on using the activity identifier and the location information in a look up of the data store, that a plurality of video game players completed the activity in the location, and including a first graphical user interface element in a map that corresponds to the location. The first graphical user interface element indicating an estimated position where the activity was completed in the location by the plurality of video game players. The operations also include presenting the map to a second video game player, the map showing the first graphical user interface element in the location.

In an example the location is a zone. In this example, the operations further include receiving a first position within the zone of the first video game player at a time of completion of the activity by the first video game player, storing the first position in the data store, determining, based on positions of the plurality of video game players stored in the data store, that the plurality of video game players completed the activity within a predefined threshold distance of each other, and setting the first graphical user interface element in the map based on the positions of the plurality of video game players. In this example, the estimated position is a center of the positions. The first graphical user interface element is set at the center. In this example, the first graphical user interface element includes a heatmap of the positions.

In an example, the operations further include receiving an event indicating a completion of the activity by the first video game player. The event includes an outcome of the activity and a first position within the location of the first video game player. The outcome is one of a success or a failure. The operations further include storing data from the event in the data store, determining, based on data stored in the data store from events received for the plurality of video game players, that the plurality of video game players completed the activity successfully within a predefined threshold distance of each other, and setting the first graphical user interface element in the map based on the positions of the plurality of video game players. In this example, the location is a zone. The location information is a zone identifier of the zone. The event further includes the activity identifier and the zone identifier.

In an example, the map is presented in a window over a portion of video game content of the video game. The video game content shows the location. The window includes an option to show the map adjacent to the video game content. In this example, the operations further include receiving the activity identifier in association with the second video game player playing the video game, receiving a position of a virtual player within the video game content. The virtual player corresponds to the second video game player. The operations further include including a second graphical user interface element in the map. The second graphical user interface element indicates the position on the map. The map as presented further shows the second graphical user interface element in the location. The operations further include receiving an updated position of the virtual player, and updating the presentation of the map by updating the second graphical user interface element to show the updated position and maintaining the first graphical user interface element.

In an example, the map is expanded and presented over the video game content upon a selection of the map in the window.

In an example, the location is a zone. The location information is a zone identifier of the zone. The window further includes a link to a video associated with the activity identifier and the zone identifier. In this example, the video is played in the window upon a first selection of the link while the presentation of the map continues in the window. Further, the video is presented over the video game content based on a second selection of the link.

In an example, the location is a zone. The location information is a zone identifier of the zone. The window further includes information about using a mechanic to complete the activity. The mechanic is associated with the activity identifier and the zone identifier. In this example, the information about using the mechanic includes at least one of: a text description, a link to a graphical animation, a link to a video file, or a link to an audio file.

In an example, the operations further include presenting video game content of the video game while the presentation of the map continues. The video game content shows a graphical user interface object that includes a plurality of levels. A location and the map correspond to one of the plurality of levels.

In an example, the video game includes progress activities, open ended activities, and competitive activities. The map is accessed based on the activity being one of the progress activities or the open ended activities.

In an example, the operations further include presenting a window in a first state to the second video game player. The window identifies the second activity and presented over video content of the video game. The operations further include presenting the window in an expanded state upon a selection of the second activity. The in the expanded state identifies the tasks of the second activity. The operations further include updating the window in the expanded state to show the map upon a selection of the activity from the tasks. In this example a location is a zone. The location information is a zone identifier of the zone. The window is updated to further show a link to a video and information about using a mechanic to complete the activity. The link and the information are associated with the activity identifier and the zone identifier and are shown simultaneously with the map.

DETAILED DESCRIPTION

Figure 1:
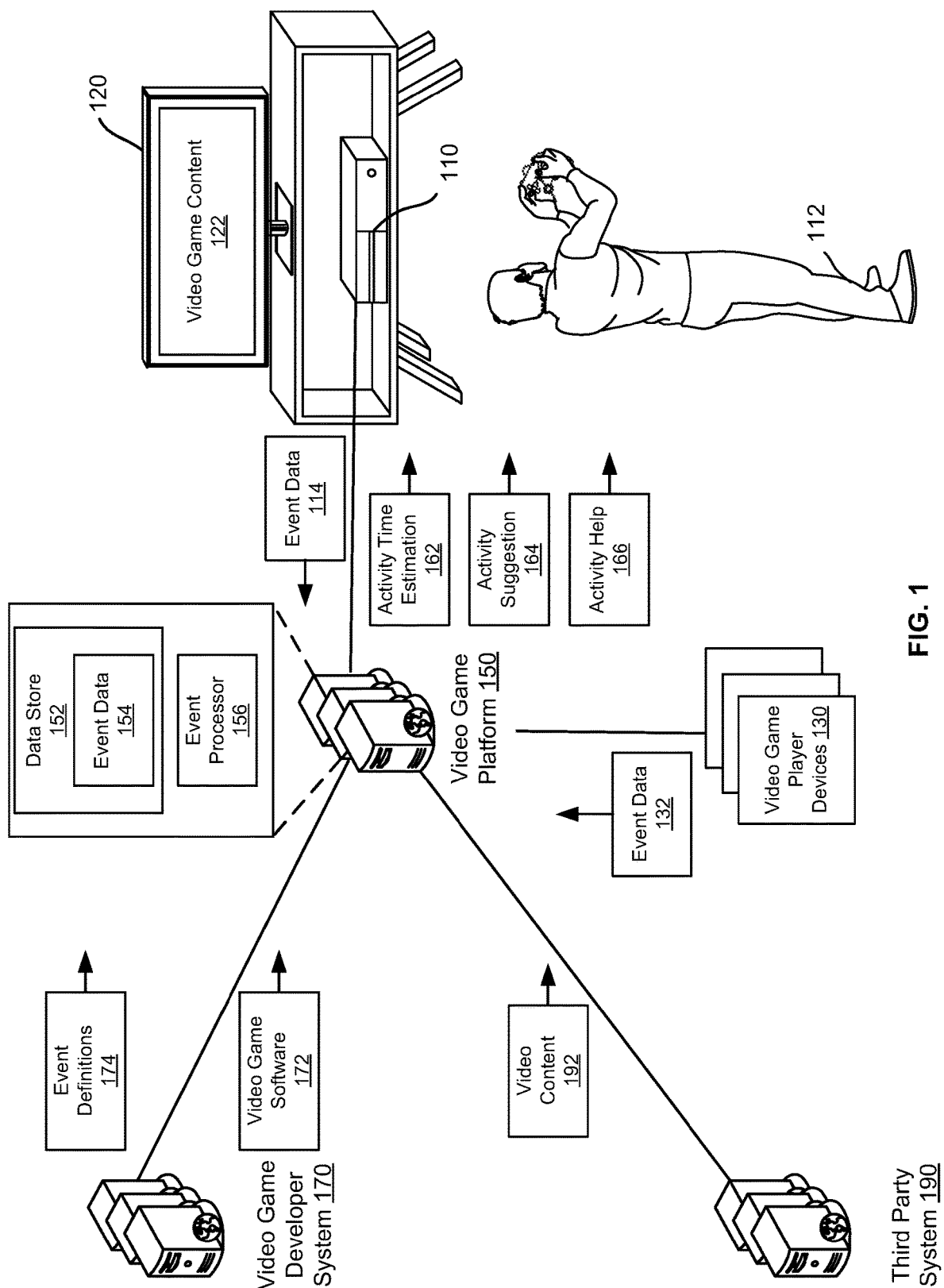
FIG. 1 illustrates an example of a computing environment for collecting and processing video game events, according to embodiments of the present disclosure.

Generally, systems and methods for improving a user video game experience are described. In an example, the user video game experience is improved by providing a unified way for, among other things, multiple video game functionalities, such as for suggesting video game activities, estimating completion time for such activities, and presenting video game help regardless of the underlying video games. This unified way need not change how a video game is developed or necessitate a common approach to video game development. Instead, instrumentation of various events in the video games is relied upon, where a video game platform (e.g., a server-based video game service) can collect and process such events based on the execution of the video games to suggest the video game activities, estimate completion times, and present the video game helps at a client level and, as needed, to customize such video game functionalities to the client level.

For instance, a video game includes a plurality of activities. When an instance of the video game is executed for a video game player (whether locally on a computing device of the video game player or remotely on the video game platform), the video game platform receives events about played activities and location information of a virtual player corresponding to the video game player in a zone of the game world. The video game platform stores such events as event data. For a played activity, the associated event data includes an activity identifier of the activity and indicates its type, its start time, its end time, potentially its outcome (e.g., success or failure), the zone where the activity was performed, and/or a position within the zone where the activity was completed. From the event data associated with the played activity, the video game platform can determine a location where the video game player completed the activity. This location can be defined at a low resolution as the zone or at a high resolution as the position within the zone.

Similarly, the video game platform receives and stores, in a data store, event data associated with multiple activities and received from computing devices of multiple video game players. Given an activity identifier of an activity, the video game platform retrieves, from the data store, the event data associated with the activity (e.g., the event data including the activity identifier) and performs a statistical analysis of the retrieved event data. Based on the statistical analysis, the video game platform determines that a certain number of video game players (e.g., a certain percentage of the video game players that played the activity exceeding a predefined threshold) completed the activity within a zone. Accordingly, the video game platform can associate the activity with the zone to indicate that, as a low resolution location, the activity can be completed in the zone. Further and based on the statistical analysis, the video game platform determines that most of the video game players that played the activity in the zone (e.g., a certain percentage over a same or a different threshold) completed the activity at positions within a threshold distance from each other and derives an estimated position of the activity completion from these positions (e.g., the estimated position can be the average). Accordingly, the video game platform can also associate the activity with the estimated position to indicate that, as a high resolution location, the activity can be completed at the estimated position. The video game platform provides a map of the zone for presentation in a user interface. A first graphical user interface (GUI) element is shown in the map to indicate the estimated position. A current position of a user playing the activity can also be shown on the map as a second GUI element.

Furthermore, the map in the user interface can be updated based on the game play of the user. The user's current position is updated in the map, while the first GUI element remains unchanged in the map.

Embodiments of the present disclosure provide many technical advantages over existing video game platforms. For instance, functionalities of a graphical user interface (GUI) are improved. In particular, by collecting events per activity, video game, and video game player, and across different types of computing devices, a video game platform of the present disclosure can accurately estimate possible location (e.g., a zone or position within the a zone) per activity and per game. Help maps can be generated and presented in GUIs in a common style across the different types of devices and video games. Each of such help maps provides relevant assistance in the GUI and improves the quality of game play.

FIG. 1 illustrates an example of a computing environment for collecting and processing video game events, according to embodiments of the present disclosure. As illustrated, the computing environment includes a video game console 110, video game player devices 130, a video game platform 150, a video game developer system 170, and a third party system 190. Video games are available to the video game console 110 from the video game developer system 170 through the video game platform 150. Video content, such as help videos demonstrating how video game activities can be played, is also available to the video game console 110 from the third party system 190 through the video game platform 150. The video game platform 150 collects, stores, and processes events from the video game player devices 130 and the video game console 110 to provide various video game-related functionalities including, for instance, suggesting video game activities, estimating completion time for such activities, and presenting video game help.

In an example, the video game console 110 represents a computing device available to a user 112 and operable to interact with one or more applications including video games. A display 140 communicatively coupled or integrated with the video game console 110 can present video game-related data, including video game content 142, to the user 112. Other types of computing devices can be available to the user 112 including, for instance, a smartphone, a tablet, a laptop, a desktop computer, or other devices with suitable memories and processors.

The video game console 110 can execute a video game locally to present the video game content 142 on the display 140. Additionally or alternatively, the video game consoles 110 can receive the video game content 142 based on an execution of an instance of the video game application on the video game platform 150, the video game developer system 170, or another remote computer system. The video game can also be downloadable to the video game console 110 from such systems.

Further, the video game console 110 can, directly or through the video game platform 150, download or stream video content from the third party system 190 for presentation on the display 140. An example of video content includes a video file generated by the video game developer 170 and uploaded to the third party system 190, where this video file demonstrates how a video game can be played, a set of activities in the video game can be played, or a set of mechanics in an activity can be used to play the activity. A mechanic generally represents at least one of a set of tools, a set of capabilities, or a set of skills available to play an activity or a portion of an activity. Another example of video content includes a video file generated by one of the video game player devices and uploaded to the third party system 190 directly or through the video game platform 150, where the video file records the game play of a video game player operating the video game player device. Likewise, a similar video file can be uploaded to the third party system 190 from the video game console 110.

In an example, the video game player devices 130 represent computing devices of video game players that may, but need not, include the user 112. Similar functionalities can be provided on each one of the video game player devices and the video game console 110.

In an example, the video game system 170 represents a computer system that includes a set of computing resources for developing video games and available to a video game developer. In particular, the video game system 170 can store video game software 172, upload such software 172 to the video game platform 150, and/or download such software 172 to the video game console 110.

The video game software 172 of a video game is program code executable to present and interact with video game content of the video game. The program code can include predefined instrumentations to generate events upon the execution of the program code. In particular, the program code includes a set of event definitions 174, where an event definition represents code defining an identifier of an event and data to be reported for the event. Examples of such event definitions 174 are further described herein below and are predefined in the program code of the video game according to event templates available from the video game platform 150. Such event templates can be defined by a service provider of the video game platform 150 and can be commonly used across multiple video game developer systems 170.

In an example, the third party system 190 represents a computer system, such as one or more content servers, for providing video content 192 to the video game console 110 directly or indirectly through the video game platform 150. As explained herein above, the video content 192 can include video files demonstrating how a video game can be played, a set of activities in the video game can be played, or a set of mechanics in an activity can be used to play the activity. The video content 192 can be uploaded to the third party system 190 from the video game developer system 170, the video game console 110, and/or one or more of the video game player devices 130 directly or indirectly through the video game platform 150.

In an example, the video game platform 150 represents a computer system that provides various video-game related functionalities to the video game console 110. For instance, the video game platform 150 is set-up as a hub between the video game console 110, the video game player devices 130, the video game developer system 170, and third party system 190. In particular, the video game software 172 and the video content 192 can be downloaded to the video game consoler 110 through the video game platform 150. An instance of a video game based on video game software stored on the video game platform 150 can be instantiated for the video game console 110. A video file can be streamed through the video game platform 150 to the video game console 110. In addition, communications data (e.g., messages, commands, etc.) can be exchanged between the video game console 110 and the video game player devices 130 through the video game platform 150.

Furthermore, the video game platform receives event data 114 from the video game console 110 and event data 132 from the video game player devices 130 and stores such received data in a data store 152 as event data 154. An event processor 156 of the video game platform 150 processes the event data 154 to generate and send any of an activity time estimation 162, an activity suggestion 164, and an activity help 166 to the video game console 110 for presentation on the display 140.

Received event data (any of the event data 114 or event data 132) represents data reported from a device (e.g., the video game console 110 or one of the video game player devices 130 as application) for an event based on an execution of program code of a video game, where the program code includes an event definition for the event. The activity time estimation 162 represents an estimated length of time to complete an activity in the video game, which may be referred to herein as completion time. The activity suggestion 164 represents information suggesting an activity available to the user 112 in the video game and not previously performed or completed by the user 112. An activity help 166 includes information, such as a video file, textual description, and/or a graphical description about completing an activity in the video game or using a mechanic in at least a portion of the activity. The processor 156 executes logic that, for instance, performs a statistical analysis across a subset of the event data 154 associated with the activity to generate the activity time estimation 162, the activity suggestion 164, and the activity help 166. In addition, the processor 156 can execute logic that customizes any of the activity time estimation 162, the activity suggestion 164, or the activity help 166 based on a context of the user 112 in the video game and/or within the platform and on the type of the video game console 110.

Generally, an activity is a unit of game play inherent to the structure of a video game. Different categories of activities exist including progress activities, competitive activities, challenge activities, and open-ended activities. The activity can be defined in a program code as object with multiple properties. The properties include an activity identifier, a name, and a category. The activity identifier is a unique identifier of the activity. When an event about the activity is reported to the video game platform 150, the corresponding event data refers to the activity identifier. The name can be a short localized name of the activity. Other properties are possible including, for instance, a description (e.g., a longer description of the activity), an image of the activity, a default availability (e.g., whether the activity is available to all video game players before launching the video game), whether completion of the activity is required to complete the video game, whether the activity can be played repeatedly in the video game, and nested tasks (child activities, also referred to herein as sub-activities). Multiple events about the activity are possible.

An example of an event about the activity can indicate changes in activity availability for a video game player (e.g., the user 112). This is primarily used to decide what activities to display and to remove spoiler block for those activities (where an activity having a spoiler may not be surfaced to the video game player). A property of this event includes, for instance, a list (e.g., array) of activities that are currently available.

An example of an event about the activity can indicate that the video player is currently participating in the activity or task (e.g., a child activity). A property of this event includes, for instance, the activity identifier of the activity. Another property can optionally be a time corresponding to the start of the participation in the activity.

An example of an event about the activity can indicate the end of the activity or task (e.g., a child activity). A property of this event includes, for instance, the activity identifier of the activity. Another property can optionally be a time corresponding to the end of the participation in the activity. Yet another property can optionally be an outcome of the activity, such as completed, failed, or abandoned.

The video game platform 150 can also collect data about a zone in a video game, where this data is reported similarly to the events based on predefinitions in program code of the video game. The zone represents an area of a game world of the video game (e.g., a virtual world) with a single coordinate system. The zone may have a two-dimensional (2-D) map image associated with it, used to display locations on the zone. The zone can be defined in the program code as an object with multiple properties. The properties include a zone identifier and a name. The zone identifier is a unique identifier of the zone. The name can be a short, localizable name of the zone. Other properties are possible including, for instance, an indication of whether the object should be treated as hidden for spoiler block uses cases (the default may be set to false), a map (e.g., a high resolution image for the zone 2-D map), a view projection (e.g., a matrix (4×4) to convert from three-dimensional (3-D) work coordinates to 2-D map position), and an image (e.g., a display image for the zone if different from the map). Multiple events about the zone are possible.

An example of an event about the zone can indicate an update to the current in-game location of the video game player. This event can be reported regularly, or whenever the player's in-game location changes significantly. A property of this event includes the zone identifier. Other properties are possible, such as optionally position (e.g., x, y, z position of the video game player character (the virtual player of the video game player) in the zone) and orientation (e.g., x, y, z vector indicating the video game player character's direction).

Another example of an event about the zone can indicate the video game player's zone, location, and orientation, at the time of starting the activity. This event can enable location-based help. A property of this event includes the activity identifier. Other properties are possible, such as optionally the zone identifier and the position and orientation of video game player's character in the video game.

Yet another example of an event about the zone can indicate the video game player's zone, location, and orientation, at the time of ending the activity. This event can also enable location-based help. A property of this event includes the activity identifier. Other properties are possible, such as optionally the outcome of the activity, the zone identifier, and the position and orientation of video game player's character in the video game.

The video game platform 150 can also collect data about an actor in a video game, where this data is reported similarly to the events based on predefinitions in program code of the video game. The actor represents an entity with behaviors in the video game. The actor can be player-controlled or game-controlled, and this can change dynamically during game play. The actor can be defined in the program code as an object with multiple properties. The properties include an actor identifier and a name. The actor identifier is a unique identifier of the actor. The name can be a localizable name of the actor. Other properties are possible including, for instance, an indication of whether the object should be treated as hidden for spoiler block uses cases (the default may be set to false), an image of the actor, and a short description of the actor. Multiple events about the actor are possible.

An example of an event about the actor can indicate that a change to the video game player's selection of actor(s). Selected actors represent the actors the video game player is controlling in the video game, and can be displayed on the video game player's profile and other presentation spaces. There can be more than one actor selected at a time. The video game should replace the list of actors upon loading save data. A property of this event includes a list (e.g., array) of actors which are currently selected by the video game player.

The video game platform 150 can also collect data about a mechanic in a video game, where this data is reported similarly to the events based on predefinitions in program code of the video game. The mechanic represents an item (e.g., tool), capability, skill, or effect that can be used by the video game player or the video game to impact game play (e.g. bow, arrow, stealth attack, fire damage). The mechanic generally excludes items that do not impact game play (e.g. collectibles). The mechanic can be defined in the program code as an object with multiple properties. The properties include a mechanic identifier and a name. The mechanic identifier is a unique identifier of the mechanic. The name can be a short, localizable name of the mechanic. Other properties are possible including, for instance, an indication of whether the object should be treated as hidden for spoiler block uses cases (the default may be set to false), an image of the mechanic, and a short description of the mechanic. Multiple events about the mechanic are possible.

An example of an event about the mechanic can indicate that mechanics available to the video game player have changed. Availability of a mechanic represents that the mechanic is available in the game world for the video game player to use, but may necessitate the video game player to go through some steps to acquire it into inventory (e.g. download from a store, pick up from the world) before using it. This event can also be used to indicate lifting of spoiler block on the mechanic object, and to filter help tips to avoid suggesting use of a mechanic that is unavailable. The video game should replace the list of mechanics upon loading save data. A property of this event includes a list (e.g., array) of mechanics which are currently available.

Another example of an event about the mechanic can indicate that the video game player's inventory has changed. Inventory refers to mechanics that are immediately usable to the video game player without having to take additional steps in the video game before using it. Inventory information can be used to estimate a player's readiness for an activity. The video game should replace the list of inventory upon loading save data. A property of this event includes a list (e.g., array) of mechanics which are currently in inventory.

Yet another example of an event about the mechanic can indicate that the video game player's load out has changed. Load out represents the mechanics that are most immediately accessible to the video player, and is the subset of inventory which is displayable to the video game player. The video game should replace the list of mechanics upon loading save data. A property of this event includes a list (e.g., array) of mechanics which are now part of the active load out.

A further example of an event about the mechanic can indicate that the mechanic has been used by or against the video game player. Properties of this event include a list (e.g., array) of mechanics which were used (e.g. fire arrow, fire damage) and whether the mechanics were used by or against the video game player. Other properties are possible, such as optionally an initiator actor identifier (e.g., an identifier of the actor that initiated the use of the mechanic), a zone identifier of the initiator actor, and a position of the initiator actor.

Another example of an event about the mechanic can indicate that the mechanic had an impact on game play (e.g. an arrow hit a target). Properties of this event include a list (e.g., array) of mechanics which were used (e.g. fire arrow, fire damage) and whether the mechanics were used by or against the video game player. Other properties are possible, such as optionally the initiator actor identifier, the zone identifier of the initiator actor, the position of the initiator actor, a target actor identifier (e.g., an identifier of the actor targeted by the mechanic), a zone identifier of the target, a position of the target actor, and an identifier of a mechanic that mitigates the initiator's mechanic(s).

The video game platform 150 can also collect data about game media in a video game, where this data is reported similarly to the events based on predefinitions in program code of the video game. The game media represents a piece of media (text, audio, video, image) related to the video game, provided by the game developer. The game media may exist in-game (e.g. cut-scene, audio log, book) or may not (e.g. developer commentary). The game media can be defined in the program code as an object with multiple properties. The properties include a game media identifier, a name, a format, a category, an unlock rule, and a uniform resource locator (URL). The game media identifier is a unique identifier of the game media. The name can be a localizable name of the game media. The format can indicate the media format, such as whether the game media is an image, audio, video, text, etc. The category indicates a type of the game media, such as whether the game media is a cut-scene, audio-log, poster, developer commentary, etc. The unlock rule indicates whether the game media should be unlocked for all video game players or based on an activity or a specific game media event. The URL references a server-provisioned media file, where this server can be part of the game developer system 170 or the video game platform 150. Other properties are possible including, for instance, an indication of whether the object should be treated as hidden for spoiler block use cases (the default may be set to false), an entitlement (e.g., indicating that only video game players who own a particular video game entitlement can unlock the game media), and an activity identifier (e.g., to associate the game media with a particular activity). Multiple events about the game media are possible.

An example of an event about the game media can indicate that a particular piece of game media has been unlocked for the video game player. A property of this event includes the game media identifier.

Another example of an event about the game media can indicate that a particular piece of game media has started in the video game. The game media object should be considered unlocked for the video game player at the corresponding time. A property of this event includes the game media identifier.

Yet another example of an event about the game media can indicate that a particular piece of game media has ended in the video game. A property of this event includes the game media identifier.

Figure 2:
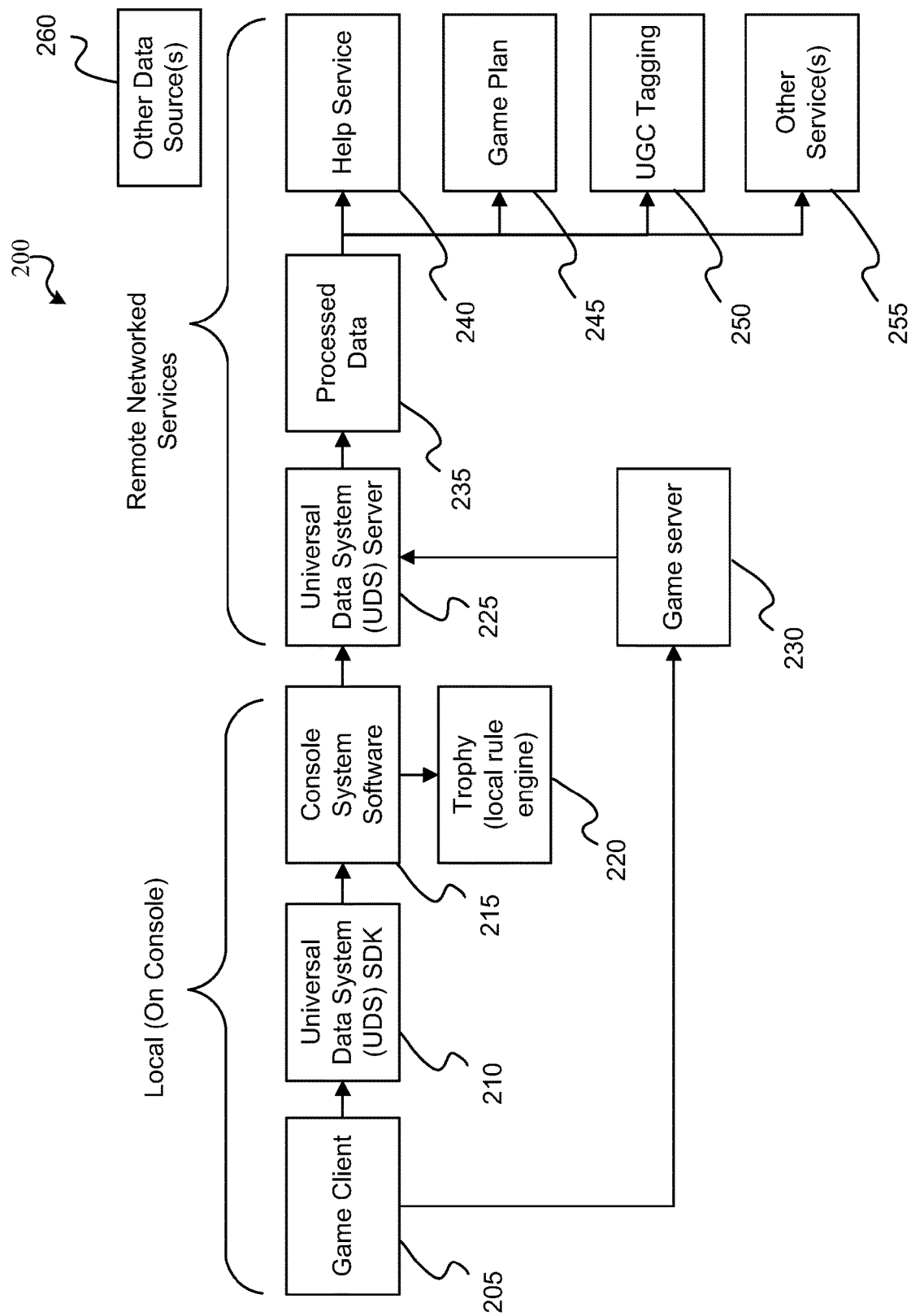
FIG. 2 illustrates an example of a system architecture for providing users with contextual information regarding available game activities, according to embodiments of the present disclosure.

FIG. 2 illustrates an example of a system architecture for providing users with contextual information regarding available game activities, according to embodiments of the present disclosure. In some embodiments, the exemplary system architecture 200 includes a game client 205, a universal data system (UDS) software development kit (SDK) 210, console system software 215, a local rule engine 220, a UDS server 225, a game server 230, processed data 235, and one or more other remote networked services, including a help service 240, game plan 245, user generated content (UGC) tagging 250, and other service(s) 255. The help service 240 may also receive information from other data source(s) 260. Some of the components of the system architecture 200 are examples of components of the video game platform 150 of FIG. 1. For instance, the UDS server 225 and the game server 230 are components of the video game platform 150.

The game client 205 and game server 230 provide contextual information regarding at least one application to a universal data system (UDS) server 225 via a UDS data model describing the logical structure of UDS data used by the UDS SDK 210. The UDS data model enables the platform (e.g., the video game platform 150) to realize remote networked services, such as the help service 240, game plan 245, UGC tagging 250, and other service(s) 255 that require game data, without requiring a game to be patched separately to support a service. The UDS data model assigns contextual information to a portion of information in a unified way across games. The contextual information from the game client 205 and UDS SDK 210 is provided to the UDS server 225 via the console system software 215. It is to be understood that the game client 205, UDS SDK 210, console system software 215, and local rule engine 220 may run on a computer or other suitable hardware for executing at least one application.

The UDS server 225 receives and stores contextual information from the game client 205 and game server 230 from at least one application. To be sure, the UDS server 225 may receive contextual information from a plurality of game clients and game servers for multiple users. The information may be uniformly processed 235 and then received by the plurality of remote networked services 240, 245, 250, and 255.

Figure 3:
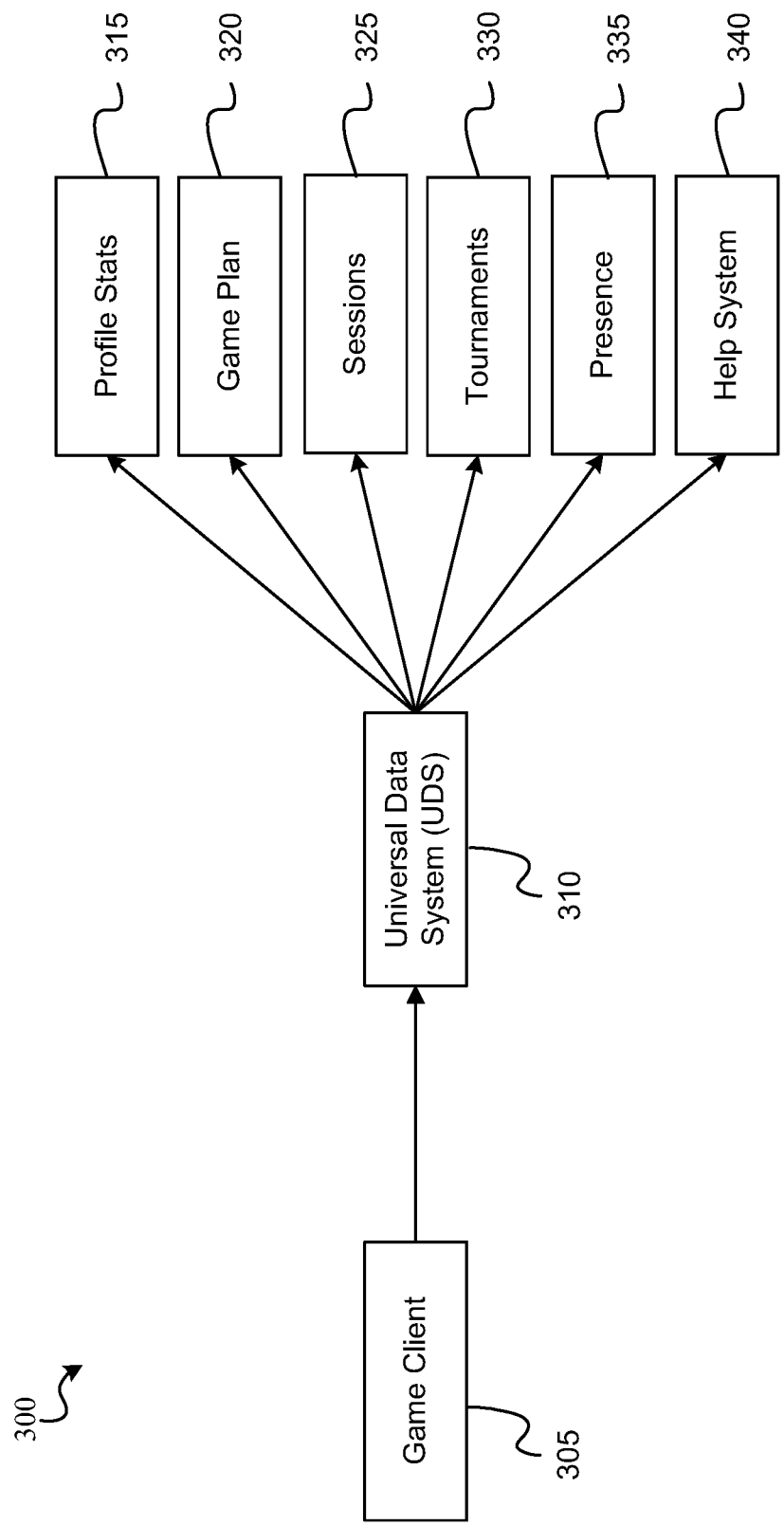
FIG. 3 illustrates another example of a system architecture, according to embodiments of the present disclosure.

FIG. 3 illustrates another example of a system architecture 300, according to embodiments of the present disclosure. A game client 305 sends contextual information to a UDS server 310, which provides the contextual information in a unified data model to a plurality of remote networked services, including profile stats 315, game plan 320, sessions 325, tournaments 330, presence 335, and help system 340.

Figure 4:
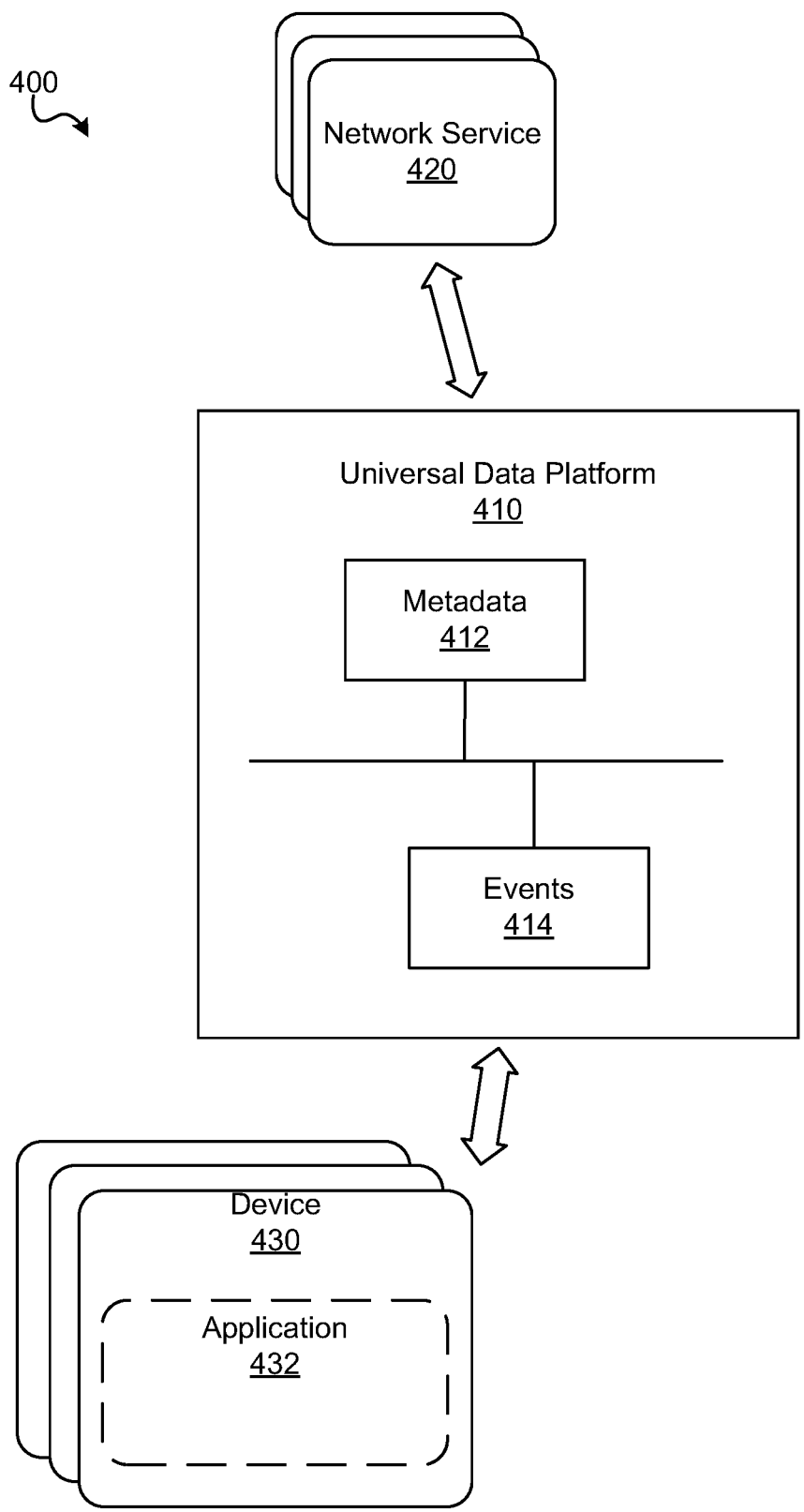
FIG. 4 illustrates an example of a system for providing a data model for a universal data platform, according to embodiments of the present disclosure.

FIG. 4 illustrates an example of a system 400 for providing a data model for a universal data platform 410, according to embodiments of the present disclosure. Some of the components of universal data platform 410 are examples of components of the video game platform 150 of FIG. 1. In one example embodiment, system 400 can include at least one device 430 configured to execute at least one of a plurality of applications 432, each application having an application data structure. The universal data platform 410 can be executed on one or more servers. The universal data platform 410 can include a data model which is uniform across the plurality of application data structures. The data model can include metadata 412 corresponding to at least one object indicated in the data model, and events 414 corresponding to a trigger condition associated with at least one metadata entry. The values of the metadata 412 and events 414 can be associated with a user profile. The universal data platform 410 can be configured to receive application data from the at least one device 430 and store the application data within the data model. The system 400 can also include a plurality of remote networked services 420 configured to access the application data from the universal data platform 410 using the data model.

In various embodiments, the metadata 412 may include: a list of all activities that a user can do in an application, an activity name, a description of the activity, a state of the activity (whether available, started, or completed), whether the activity is required to complete an objective or campaign, a completion reward for the activity, an intro or outro cut-scene, an in-game location, one or more conditions that must be met before the activity becomes available, and a parent activity that contains the activity as a sub-activity. Metadata 412 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 412. In addition, the metadata 412 may indicate whether or not a particular activity, entity (such as a character, item, ability, etc.), setting, outcome, action, effect, location, or attribute should be marked as hidden.

Events 414 may be fired in response to several various trigger conditions. For example, such trigger conditions may include: an activity that was previously unavailable becomes available, a user starts an activity, a user ends an activity, an opening or ending cut-scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 414 may include further information regarding a state of the application when the events 414 were triggered, for example a timestamp, a difficulty setting and character statistics at the time a user starts or ends an activity, success or failure of an activity, or a score or duration of time associated with a completed activity. It is to be understood that metadata 412 and events 414 may include any and all contextual information related to activities described in the present disclosure.

Figure 5:
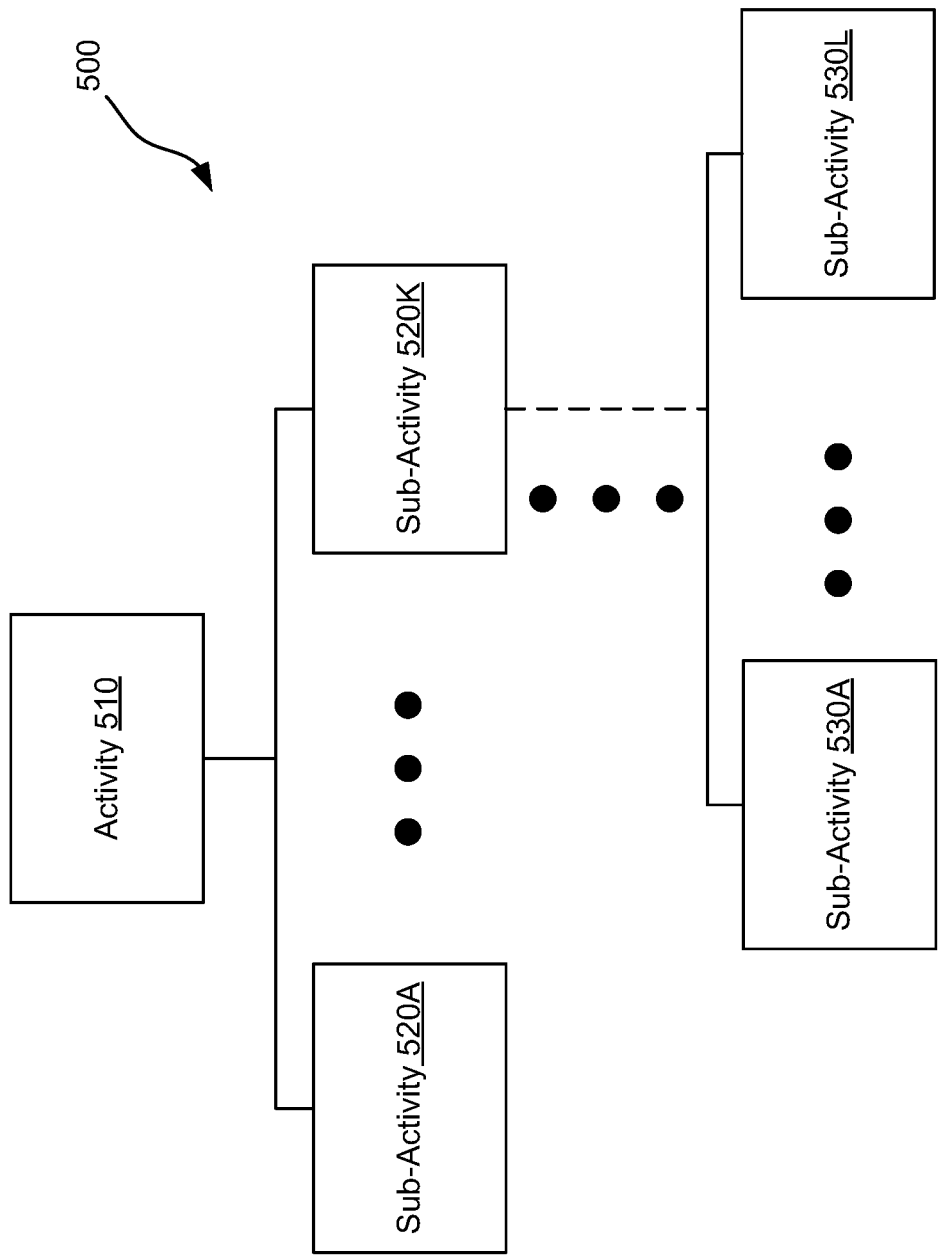
FIG. 5 illustrates an example of an activity hierarchy, according to embodiments of the present disclosure.

FIG. 5 illustrates an example of an activity hierarchy, according to embodiments of the present disclosure. As illustrated, an activity 510 can include multiple nested tasks, referred to herein as sub-activities, forming a hierarchy 500. The activity 510 can be a node on top of the hierarchy 500 (e.g., a root node) and can have a set of child sub-activities 520A-520K at the next level of the hierarchy 500. In turn, each one of the sub-activities 520A-520K may be a child node of the activity 510 and, possible, a parent node to a set of sub-activities at the next hierarchy level. For instance, the sub-activity 520K is a parent node to a set of sub-activities 530A-530L. This type of association between nodes, each representing a sub-activity, can be repeated at the different levels of the hierarchy 500. A set of mechanics can be associated with each node indicating that such mechanic(s) can be available or usable in the activity corresponding to the node.

As explained herein above, the activity 510 has an activity identifier. Each sub-activity also represents an activity and, thus, has an activity identifier too. Likewise, each of the mechanics has a mechanic identifier. Associations between the activity identifiers themselves and between the activity identifiers and the mechanic identifiers can be defined based on the hierarchy 500. Such associations can be stored in objects that define the activities (or sub-activities) and/or that define the mechanics and/or can be stored in events that relate to such objects. For instance, the activity identifier of the sub-activity 520K can be associated with the activity identifier of the activity 510 and/or the activity identifiers of the sub-activities 530A-530L. Similarly, the activity identifier of the sub-activity 530L can be associated with the activity identifier of the sub-activity 520L and/or the mechanic identifiers of the mechanics 540A-540M. Further, a mechanic identifier of a mechanic can be associated with an activity identifier.

Figure 6:
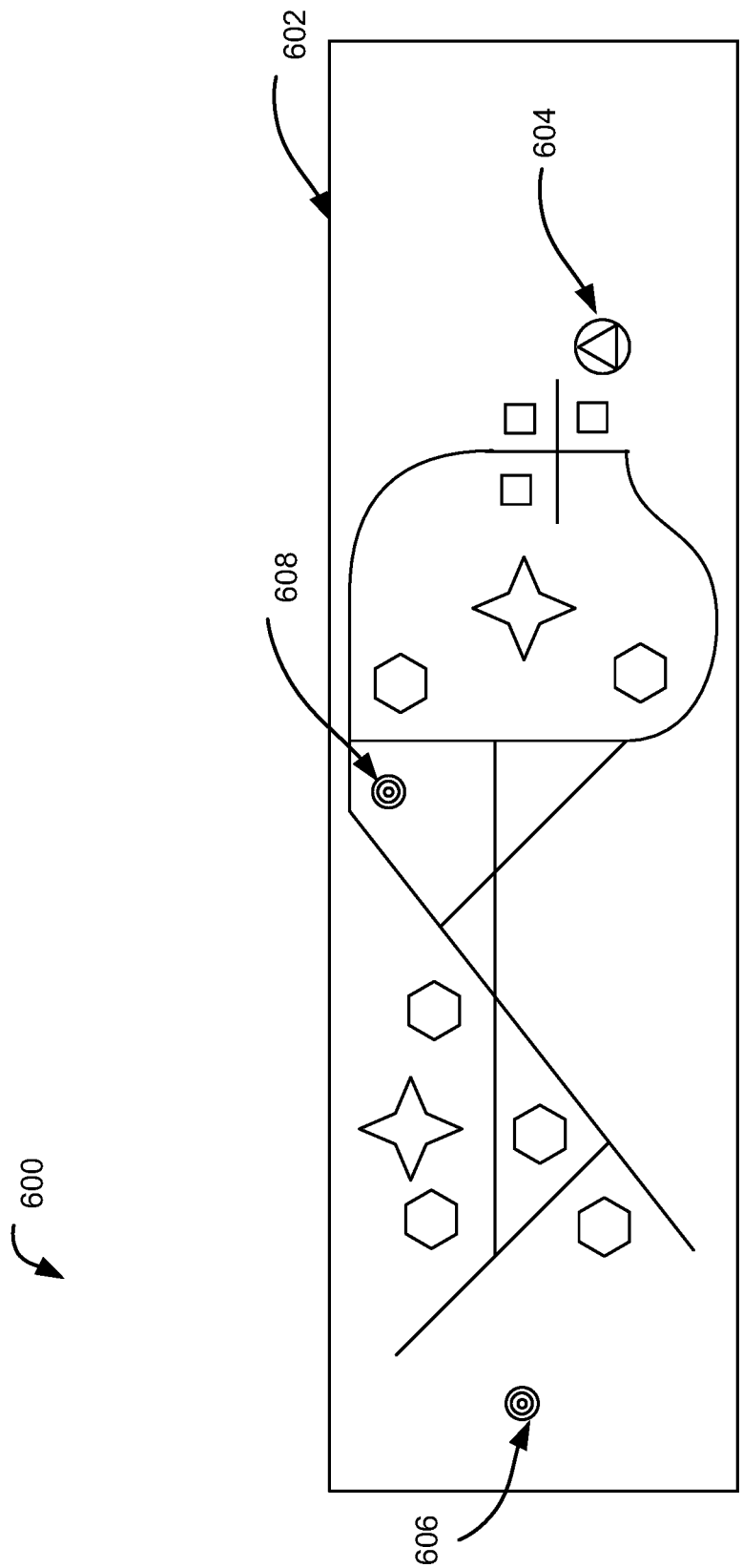
FIG. 6 depicts an example of a user interface presented by a video game console, according to embodiments of the present disclosure.

FIG. 6 depicts an example of a user interface presented by a video game console (e.g., the video game console 110 of FIG. 1), according to embodiments of the present disclosure. The user interface 600 presents a map 602 of a zone of a video game that includes a player location 604, a first activity completion location 606, and a second activity completion location 608. This map is received from a video game platform (e.g., the video game platform 150 of FIG. 1) and shows locations within the zone to complete activities.

As illustrated by FIG. 6, the map 602 of the user interface 600 presents a zone of a video game with two locations where other players have completed a respective activity. The video game platform generates a first activity completion location 606 associated with an activity identifier (e.g., Activity A), and a second activity completion location 608 associated with a different activity identifier (e.g., Activity B). The user interface may also receive user inputs (e.g., a mouse-click, a controller button, a touch gesture) on the presented locations to obtain additional information about the location. Other data can be shown in the user interface 600. For instance, the user interface 600 can present simultaneously with the map 602, a portion of video content that shows the user how to complete one of the activities (e.g., Activity A or Activity B) within the video game and/or information (e.g., text) about using a mechanic to complete the activity.

The video game platform may additionally generate locations of interest corresponding to a mechanic location, an optional bonus feature, or other video game events that are not associated with an activity completion. The user interface may present various additional locations of interest based on individualized factors such as game progress percentage, user skill level, or user completion of other bonus activities.

Figure 7:
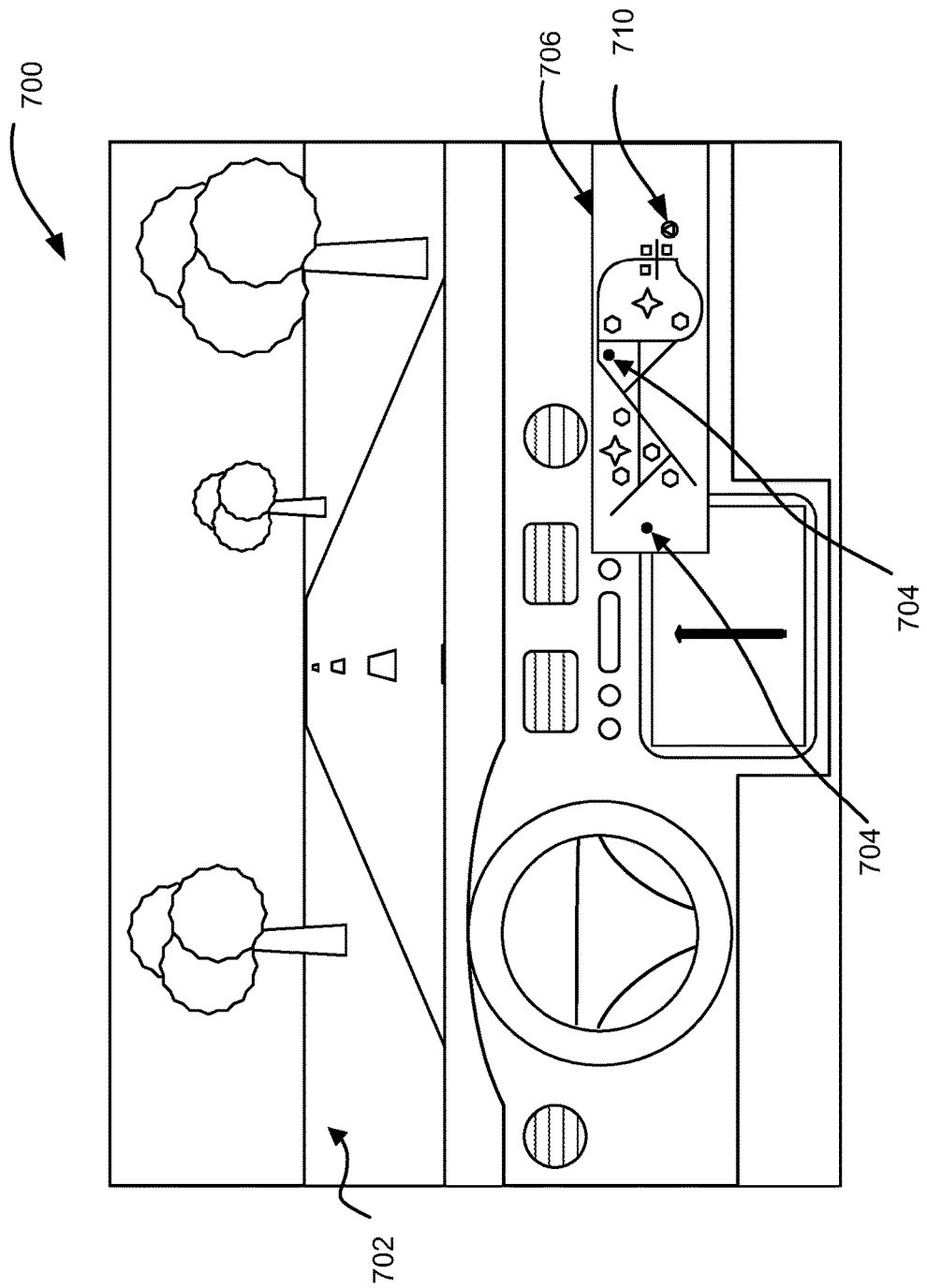
FIG. 7 illustrates an example of presenting video game help in a user interface, according to embodiments of the present disclosure.

FIG. 7 illustrates an example of presenting video game help in a user interface, according to embodiments of the present disclosure. In some embodiments, the user interface 700 depicts video game content 702. The user interface 700 may display a map 706 superimposed over at least a portion of the video game content 702. The map 706 may illustrate the current position 710 of the video game player that may be updated based on the video game player's interactions with the user interface 700. The current position 710 of the video game player may reorient or traverse the map 706 while maintaining other map features such as activity completion locations 704. The user interface 700 may orient the map 706 in a cardinal direction up, a travel direction of the video game player up, or a moving based on the orientation of the view of a video game player (e.g., locked to a first person perspective of the map). In some cases, upon a particular user interaction with the map 706 (e.g., a double-click), the map 706 is displayed using an expanded format (e.g., full screen) over the video game content 702. In this case, the video game content 702 may be paused.

Figure 8:
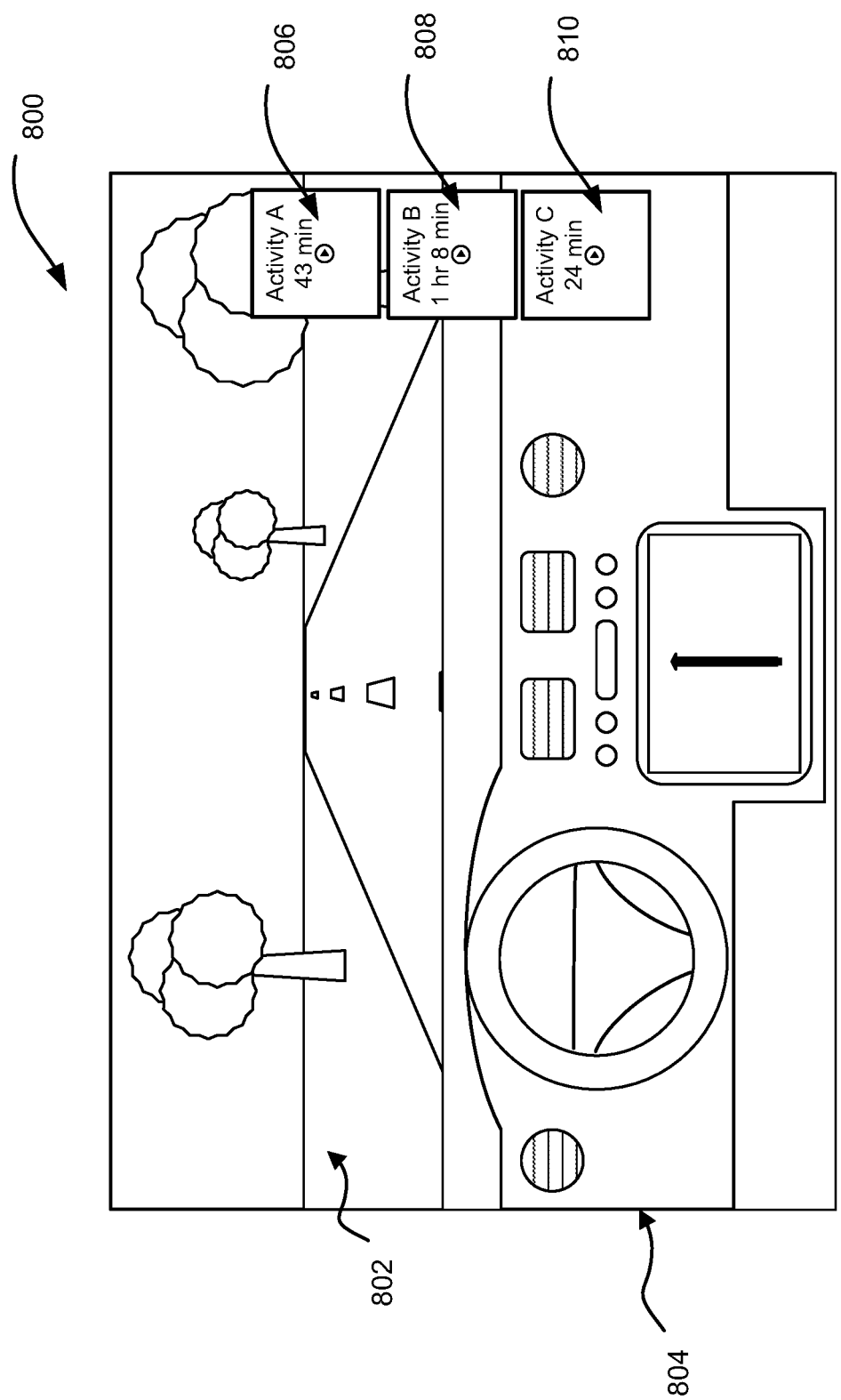
FIG. 8 illustrates a user interface presented on a display, according to embodiments of the present disclosure.

FIG. 8 illustrates a user interface 800 presented on a display (e.g., the display 120 of FIG. 1), according to embodiments of the present disclosure. The user interface 800 shows various information and functionalities that relate to a video game. In an example, video game content 802 may be presented in a portion of the display. The user interface 800 may also display relevant activity cards on a portion of the user interface 800. Each activity card can be presented as a window, icon, or some other GUI element, include information about an activity, and can be selected to launch the activity or request help about the activity.

In one example, the video game has three relevant activities to a video game player. These and other activities may be determined based on one or more activities that the video game player is involved in in the video game or other applications available from the video game console and/or the video game platform. Accordingly, the user interface 800 displays three activity cards, each corresponding to one of the activities (illustrated in FIG. 8 as activity cards for Activity A 806, Activity B 808, and Activity C 810). In some cases, the user interface 800 may present an average or expected time in the activity card to assist with a user election of an activity card.

Figure 9:
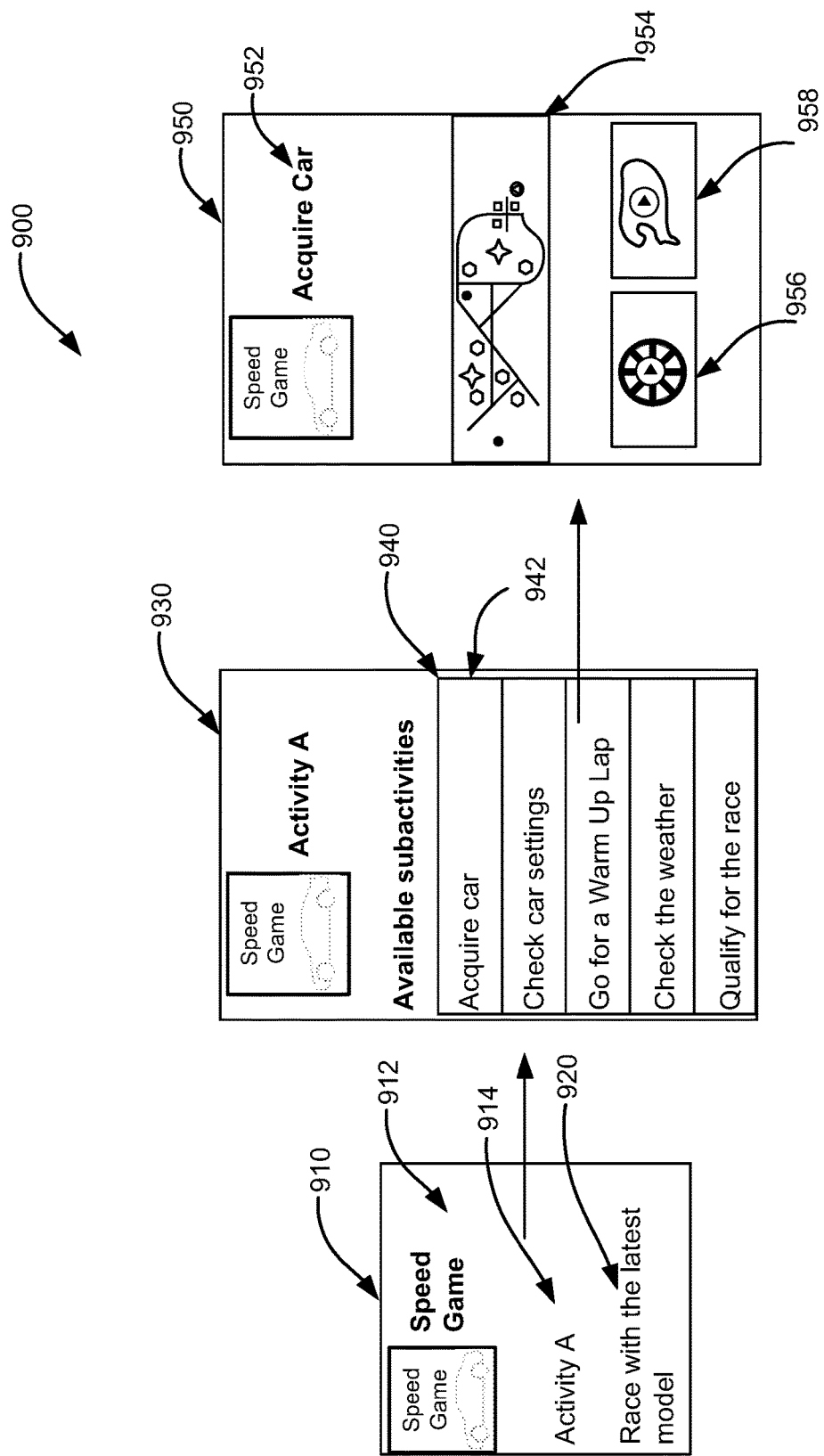
FIG. 9 illustrates an example of displaying video game help through a user interface, according to embodiments of the present disclosure.

FIG. 9 illustrates an example of displaying video game help through a user interface 900, according to embodiments of the present disclosure. Initially, the user interface 900 presents an activity card 910 for an activity. Upon a user interaction with the activity card 910, the user interface 900 presents an expanded activity card 930 showing sub-activities of the activity. Upon a user selection of a sub-activity, the user interface 900 presents a help card 950 that includes a map of a zone showing a current user position and activity completion location for the selected sub-activity (or, more generally, a selected activity), as well as links to video portions that show how the sub-activity can be played.

In one example, the activity card 910 includes a header section 912, an activity identifier 914, and an activity description 920 about the activity. In comparison, the expanded activity card 930 includes additional information related to the activity. In the example illustrated by FIG. 9, the expanded activity card 930 includes a list of some of the available sub-activities 940 available to a video game player. The user interface 900 may receive a selection of a sub-activity 942 within the expanded activity card 930. In the current example, the user interface 900 receives a selection of the sub-activity 942 "Acquire Car" from the list of sub-activities 940. Any of the activity card 910 or the expanded activity card 930 may include information or one or more indicators that indicate whether help is available for the activity. Such information and/or indicators can be presented as a selectable graphical user interface element that triggers the presentation of the available help (e.g., the presentation of the help card 950).

In response to the selection, the user interface 900 displays the help card 950 including additional details and help specific to the sub-activity 942. The help card 950 includes a title 952 of the sub-activity 942, a map 954 of the activity, and links to portions of video content 956 and 958. The map 954 is an example of the map 602 of FIG. 6. A link can be to video showing a game play of another player completing the sub-activity 942 in the zone or at a particular completion location within the zone (e.g., the activity completion location 704 of FIG. 7), where this link is available based on an association between the video and an activity identifier 914 of the sub-activity 942, a zone identifier of the zone, and/or a location identifier (e.g., position data) of the completion location. The link can be presented as a thumbnail in the help card 950. Upon a user selection of the link (e.g., a click on the thumbnail), the video can be played in the help card 950 while the presentation of the map 954 continues. Upon a second selection of the link (e.g., a double click over the thumbnail), the video can be expanded to full screen (e.g., to cover the video content 956). Whether a video portion via a user selection from the help card 950 or via a user selection of the activity completion location 704, the relevant video portion can be presented. Further, the help card 950 can also include other information such text, graphics, or video links about using a mechanic to complete the activity. This information is available based on an association between the mechanic and the activity identifier 914 of the sub-activity 942 and/or the zone identifier of the zone.

Figure 10:
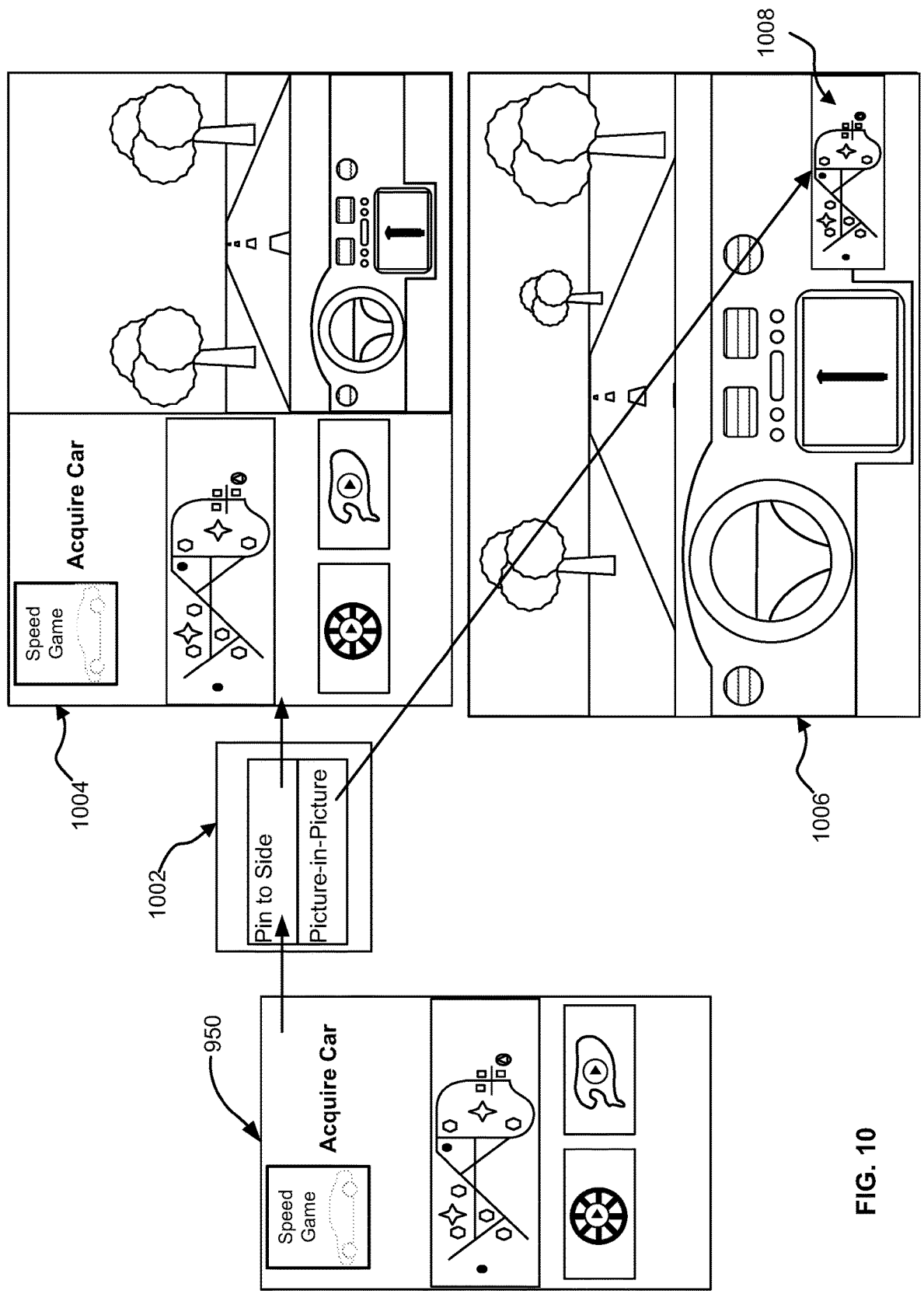
FIG. 10 illustrates examples of presenting video game help in a user interface, according to embodiments of the present disclosure.

FIG. 10 illustrates examples of presenting video game help in a user interface, according to embodiments of the present disclosure. In some embodiments, the user interface receives a selection of a help card (e.g., the help card 950 of FIG. 9) and presents a configuration menu 1002 of display configuration options. In some examples, a pin to side option from the configuration menu 1002 corresponds to showing the help card 950 or a map from the help card 950 (e.g., the map 954) in a side-pane 1004. If this option is selected, the user interface presents the help card 950 or the map in a window adjacent to the window showing video game content 1006, while the execution of the video game continues. In addition, a picture-in-picture option is available from the configuration menu 1002. This option corresponds to showing the help card 950 or the map, in a picture-in-picture 1008 window, superimposed over the video game content 1006, while the execution of the video game continues.

Figure 11:
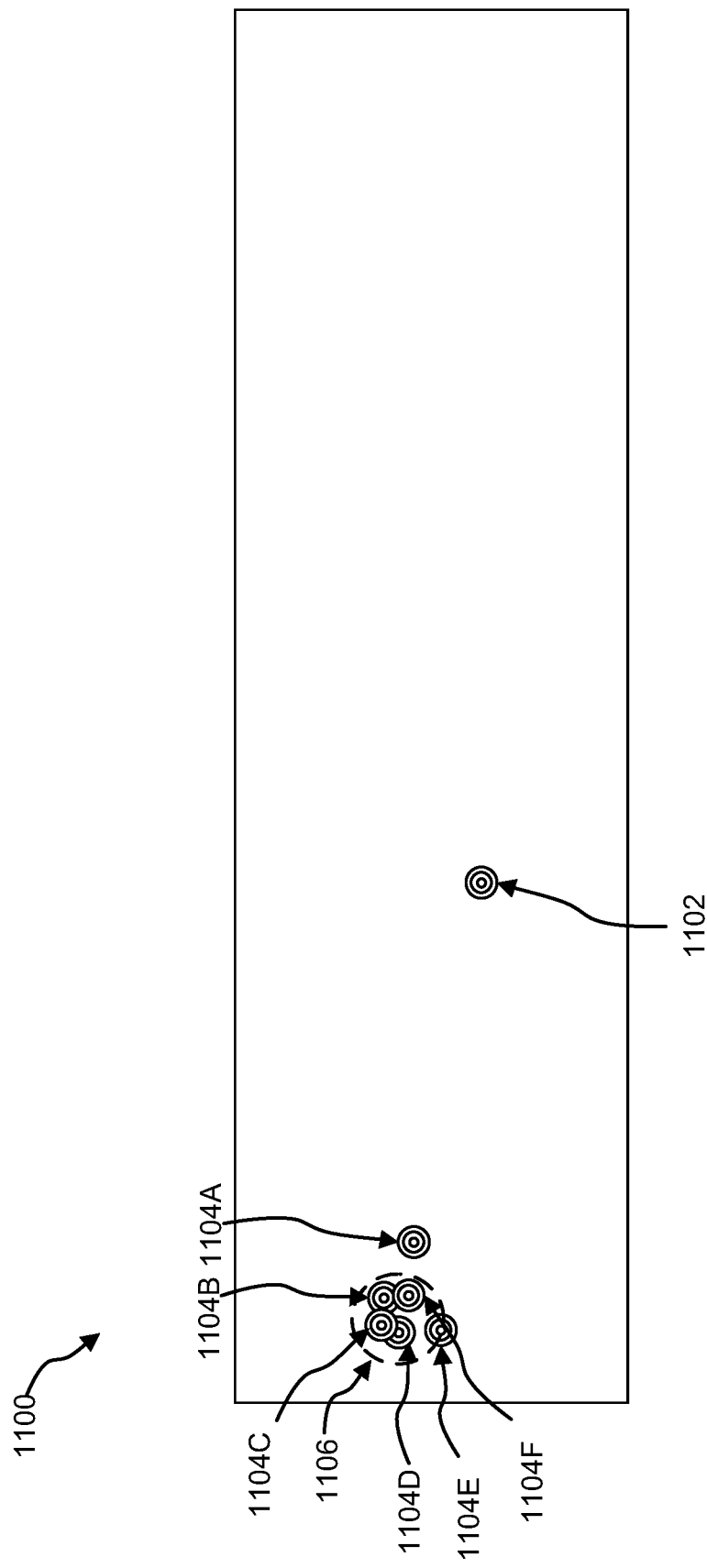
FIG. 11 illustrates an example of determining an activity completion location by associating events and map locations of a video game, according to embodiments of the present disclosure.

FIG. 11 illustrates an example of determining an activity completion location by associating events and map locations of a video game, according to embodiments of the present disclosure. For instance, a video game platform (e.g., the video game platform 160 of FIG. 1) receives events about activities from a plurality of computing devices of video game players (e.g., the videogame player devices 130 of FIG. 1) and stores these events as event data (e.g., the event data 154 of FIG. 1) in a data store (e.g., the data store 152 of FIG. 1). The event data include, among other things, activity identifiers, zone identifiers, outcomes of the activities, positions (x, y, z) of virtual players corresponding to the video game players, and other data as described in connection with FIG. 1.

In one example, for a zone having a zone identifier, the video game platform uses the zone identifier in a look-up to the data store to determine event data that includes the zone identifiers. The video game platform determines, from this event data, activity identifiers of activities performed in the zone, outcomes of the activities, and positions where the activities were completed. For an activity of these activities that is a progress activity or an open ended activity, the video game platform determines whether the number of video game players that completed the activity exceeds a predefined threshold number. If so, the video game platform associates the activity with the zone to indicate that, at a low resolution, the activity can be completed in the zone. Further, if a certain number of the positions are in the zone and within a certain threshold distance relative to each other and if that number exceeds a predefined threshold number, the video game platform generates an estimated completion position of the activity within the zone. The video game platform associates the activity with the estimated completion position in the zone to indicate, at a high resolution, a specific location in the zone where the activity can be completed. Further, the video game platform determines a map of the zone from properties of the object that defines the zone, as described in connection with FIG. 1. The estimated position can be shown as a GUI element (e.g., a pin, a circle, etc.) overlaid on the map.

In the illustrative example of FIG. 11, the video game platform determines that two activities were performed in a zone 1100. For the first activity, the video game platform determines, from the event data, only one position 1102 of a video game player was observed in the zone 1100. Because this number (e.g., one) is not sufficient (e.g., falls below a predefined threshold), the video game platform does not associate the zone 1100 with the activity. In comparison, for the second activity, the video game platform determines, from the event data, that a large number (e.g., exceeding the predefined threshold) of video game players completed the activity while being at positions 1104A-F within the zone 1100. Accordingly, the video game platform associates the zone 1100 with the second activity to indicate that this activity can be completed in the zone 1100. In addition, the video game platform determines that the positions 1104B-F are within a predefined threshold distance 1106 of each other, while the position 1104A is outside of the predefined threshold distance 1106. Because the number of positions within the threshold distance 1106 (e.g., positions 1104B-F) is large (e.g., exceeds a predefined threshold) and the number of positions not being with the threshold distance (e.g., position 1104A) is small (e.g., is smaller than a predefined threshold), the video game platform generates an estimated position from the positions 1104B-F, where the estimated position corresponds to a location where the second activity can be completed in the zone 1100. In an example, the estimated position is an average of the positions 1104B-F. In another example, the estimated position is set as the center of a circle that contains the positions 1104B-F and having a radius smaller than or equal to the threshold distance 1108. In yet another example, the estimated position is set an area on the map, where the area corresponds to the circle or to a heatmap of the positions 1104B-F.

The above example is provided for illustrative purposes. The embodiments of the present disclosure are not limited as such. In particular, the video game platform can associate locations (zone or position) with multiple activities, combinations of activities and a set of tasks of the activity (e.g., the sub-activities described in connection with FIG. 5), mechanics, zones, shown actors, shown targets, and/or any combination of objects defined in program code of the video game and for which events are received and stored.

In an example, a zone can include multiple areas or levels (e.g., a zone can correspond to a building that has multiple levels). A map can be generated per area or level. The analysis of event data to determine completion positions can also be refined to the area or level.

Further, a map presented in a user interface may include one or more zones. For example, a user is playing an activity associated with a first zone. However, the user's virtual player is not currently in a second different zone. In this example, the map may include at least the first zone and the second zone, such that the user can view both their current location in the first zone and one or more activity completion locations in the second zone in one map.

In addition, an activity may be associated with one or more zones. For example, completion of the activity occurs in multiple zones (e.g., the activity has multiple completion locations, and these locations are distributed within multiple zones). In this example, the video game platform can associate the activity with the multiple zones, or one or more of the multiple zones where a predetermined number or more completion of the activity happened. In this case, the map may include the multiple zones or the one or more zones.

Figure 12:
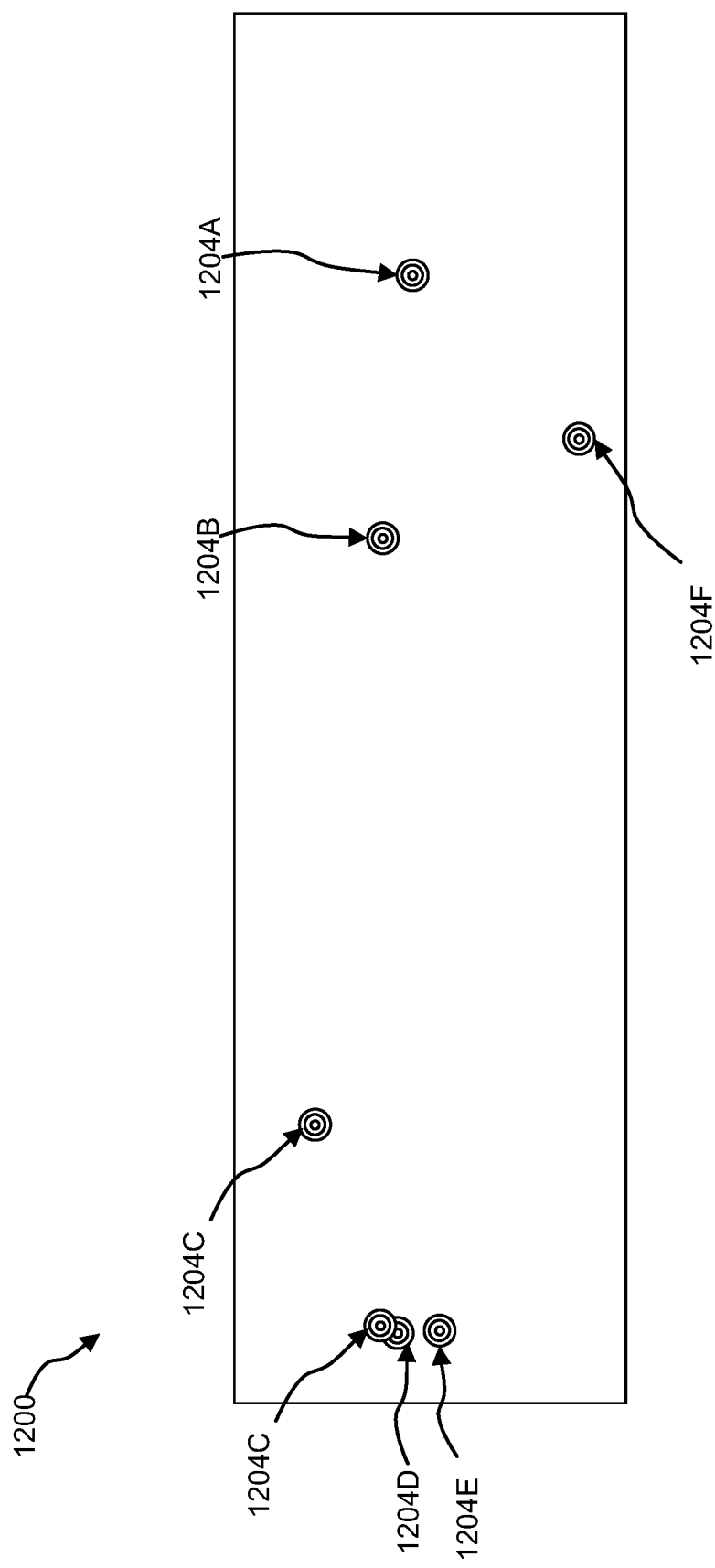
FIG. 12 illustrates another example of determining an activity completion location by associating events and map locations of a video game, according to embodiments of the present disclosure.

FIG. 12 illustrates another example of determining an activity completion location by associating events and map locations of a video game, according to embodiments of the present disclosure. Here, and like the determination described in connection with FIG. 11, a video game platform (e.g., the video game platform 150 of FIG. 1) determines, from event data, that a zone 1200 is associated with an activity, where a larger number (e.g., a number exceeding a predefined thresholds) of positions 1204A-F where the activity was completed belongs to the zone 1200. However, and unlike the determination described in connection with FIG. 11, the video game platform determines that a large number of these positions (e.g., positions 1204A-C and 1204F) are not within a predefined threshold distance from each other. Accordingly, the video game platform can generate an association indicating, at a low resolution, that the activity can be completed within the zone 1200, but cannot generate an association, indicating at a high resolution, an estimated position for the completion in the zone 1200 because such estimated position cannot be determined. In other words, whereas in FIG. 11, the video game platform can provide a map indicating a zone and an estimated position within the zone to complete an activity, the video game platform can here provide a map indicating the zone but not the estimated position. In both maps, the map can be updated (e.g., based on a specific user input at an input device requesting so), the various positions where the other players completed the activity.

Figure 13:
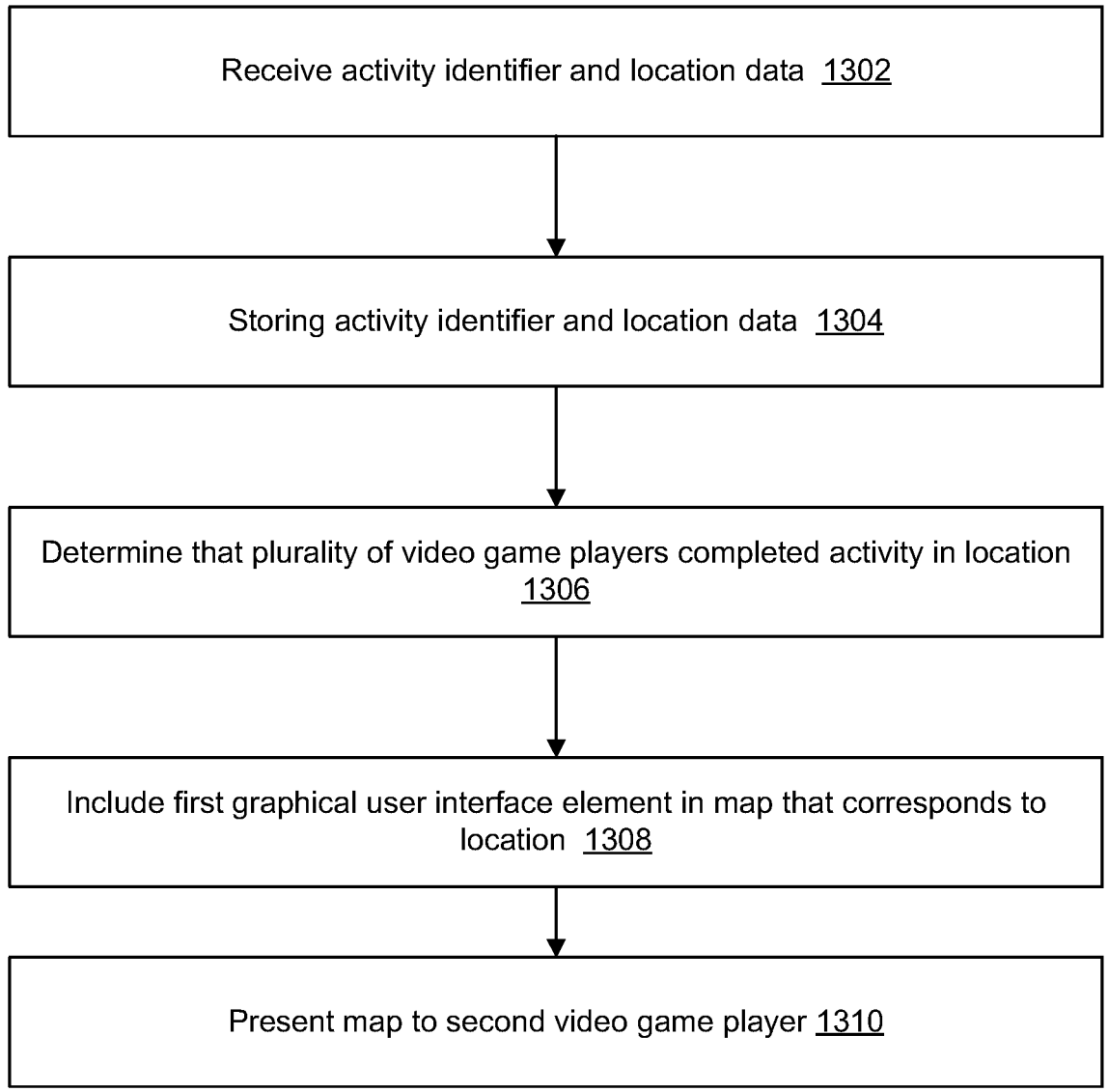
FIG. 13 illustrates an example of a flow for presenting maps including graphical user interface elements to video game players, according to embodiments of the present disclosure.
Figure 14:
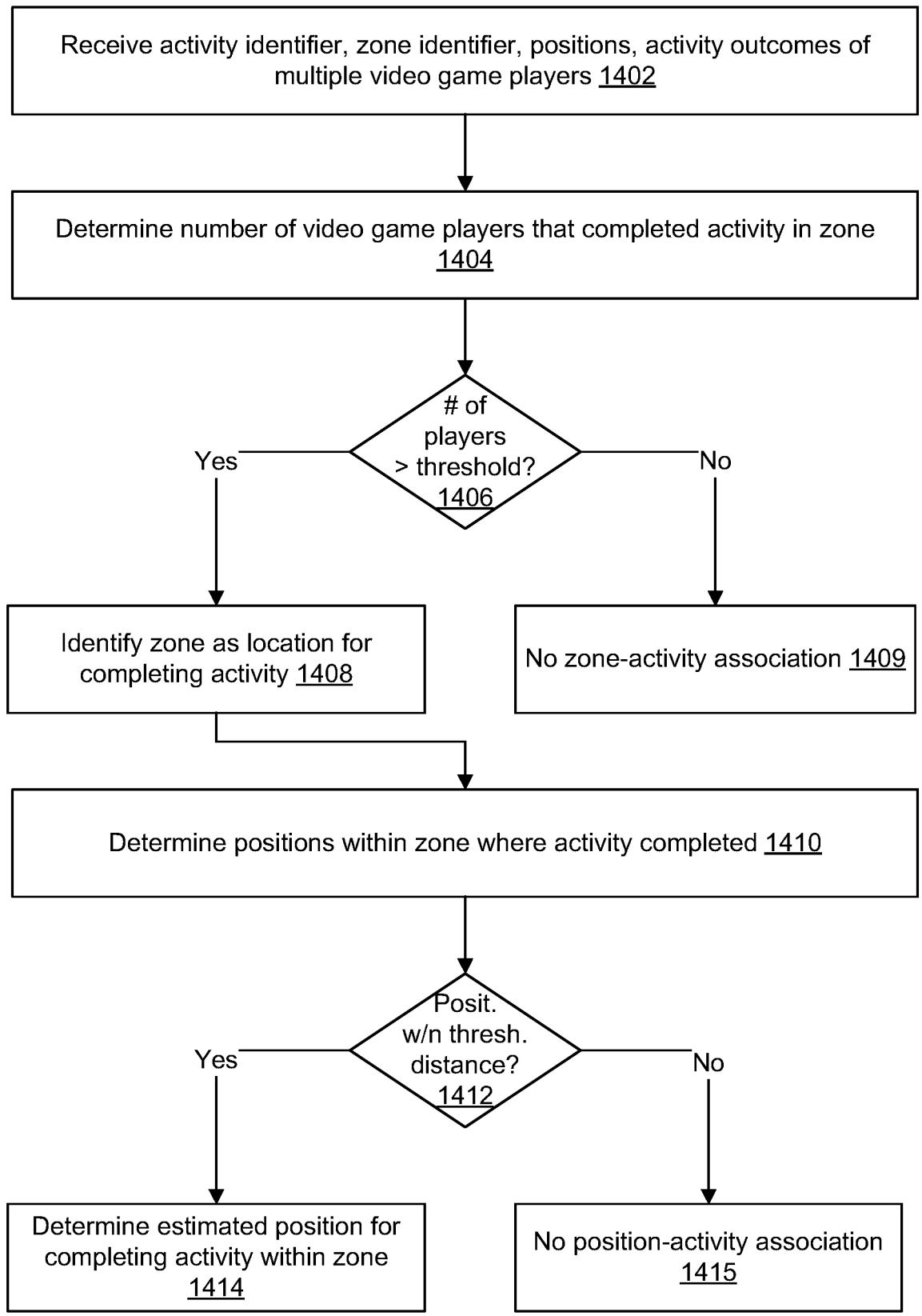
FIG. 14 illustrates an example of a flow for determining a position of an activity completion location within a zone of a video game, according to embodiments of the present disclosure.
Figure 15:
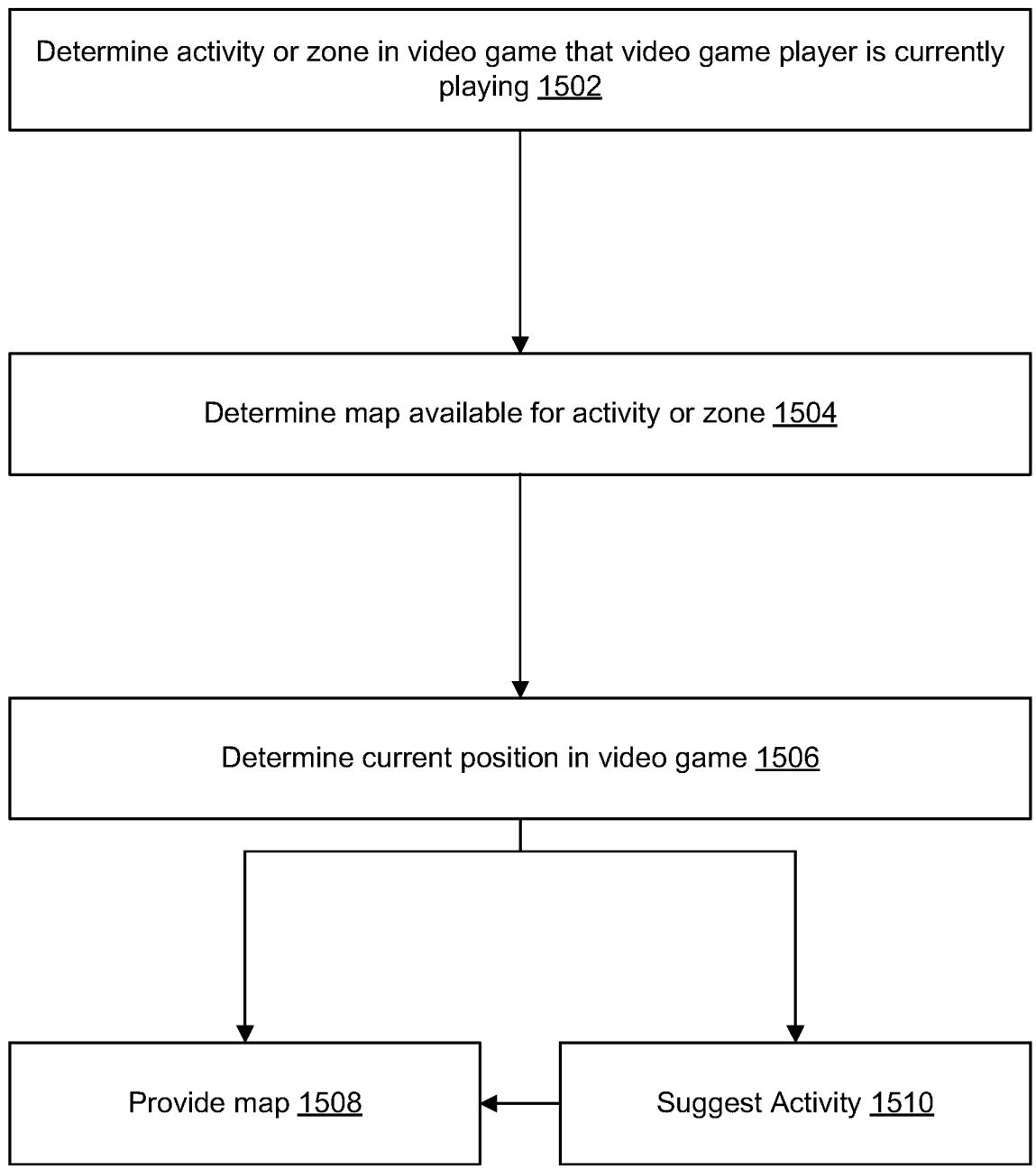
FIG. 15 illustrates an example of a flow for presenting a map including graphical user interface elements depicting activity completion locations, according to embodiments of the present disclosure.

FIGS. 13-15 illustrate example flows for providing maps including graphical elements as help assistance. The operations of the flows can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

FIG. 13 illustrates an example of a flow for presenting maps including graphical user interface elements to video game players, according to embodiments of the present disclosure. In an example, the flow includes operation 1302, where the computer system receives an activity identifier of an activity completed by a first video game player in a video game. The computer system also receives location information of a location within the video game where the activity was completed. For instance, the first video game player may operate a video game console to play the video game. The video game console sends event data to the video game platform upon an execution of program code of the video game. The video game platform receives the event data and this event data includes the activity identifier and the location information. The location information can be any of a zone identifier of a zone where the activity was completed and/or a position within the zone where the activity was completed. The event data may include information such as an activity identifier, mechanic identifier. The activity identifier and the zone identifier can be predefined in the program code of the video game.

In an example, the flow includes operation 1304, where the computer system stores the activity identifier and location information in a data store. For instance, the computer system stores multiple as part of the event data. The computer system stores similar event data for events received from a plurality of computing devices operated by one or more video game players.

In an example, the flow includes operation 1306, where the computer system determines, based on using the activity identifier and the location information in a look up of the data store, that multiple video game players have completed the activity in the location. For instance, the video game platform determines, from the event data, the number (or percentage) of video game players that completed the activity in the zone. By determining that this number (or percentage) exceeds a predefined threshold, the computer system determines that the completion of the activity likely occurs in the zone. Therefore, the computer associates the zone with the completion of the activity by storing the zone identifier in association with the activity identifier in the data store. In another illustration, the computer system determines, from the event data, the number (or percentage) of video game players that completed the activity while being in positions in the zone within a predefined threshold from each other. By determining that this number (or percentage) exceeds a predefined threshold, the computer system determines that the completion of the activity likely occurs at an estimated position within the zone. The computer system can set this estimated position as, for instance, the average or the center of the positions. Further, the computer associates the estimated position with the completion of the activity by storing the estimated position and the zone identifier in association with the activity identifier in the data store.

In an example, the flow includes operation 1308, where the computer system includes a first graphical user interface element in a map that corresponds to the location. For instance, the map is associated in the data store with the zone identifier. The computer system retrieves the map from the data store based on a look up that uses the zone identifier. Further, the computer system updates the map to include the first graphical user element at the estimated position.

In an example, the flow includes operation 1310, where the computer system presents the map to a second video game player. For instance, the map is sent to a computing device of the second video player (e.g., a video game console) and the video game console presents it on a display. As presented, the map shows the first graphical user interface element. The map can show other information as described herein above in connection with FIGS. 6-9. For instance, a current position of the second video game player in the zone (or more generally in the video game) can be determined from events of the second video game player. The map can be updated, locally by the computing device or remotely by the video game player, to also show a second graphical user interface element that corresponds to the current position of the second video game player.

FIG. 14 illustrates an example of a flow for determining a position of an activity completion location within a zone of a video game, according to embodiments of the present disclosure. In an example, the flow includes operation 1402, where the computer system receives an activity identifier of an activity of the video game, a zone identifier of the zone, activity outcomes (e.g., indicating that the activity was completed in the zone), and positions within the zone of multiple video game players. For instance, such data can be received in events from computing devices (e.g., video game consoles) of the video game players and can be stored over time as event data in a data store.

In an example, the flow includes operation 1404, where the computer system determines the number of video game players that completed the activity in the zone. For instance, the computer system determines this number based on a look up to the data store.

In an example, the flow includes operation 1406, where the computer system determines whether the number of video game players exceeds a predefined threshold. If so, the flow proceeds to operation 1408. Otherwise, the flow proceeds to operation 1409.

In an example, the flow includes operation 1408, where the computer system identifies the zone as a location for completing the activity associated with the activity identifier. The computer system can store this identification as an association between the zone identifier and the activity identifier in the data store. This association is used to provide a map of the zone indicating that the zone is a location where the activity can be completed.

In an example, the flow includes operation 1409, where the computer system does not generate the association indicating that the zone is a location for completing the activity. By not doing so, no map can be provided as an example of this indication.

In an example, the flow includes operation 1410, where the computer system determines the positions of the video game players within the zone, where the positions correspond to specific locations where the activity was completed. For instance, the positions are determined based on a look-up to the data store. If the number of positions is small (e.g., less than a predefined threshold number), operation 1415 can be performed. Otherwise, operation 1412 follows operation 1410.

In an example, the flow includes operation 1412, where the computer system determines whether the positions of the video game players are within a threshold distance from each other. If most of the positions (or some number over a predefined threshold number) are within the threshold distance, operation 1414 follows operation 1412. Otherwise, operation 1415 can be performed.

In an example, the flow includes operation 1414, where the computer system determines an estimated position for completing the activity within the zone. For instance, the estimated position is computed as an average, a center, or a heatmap of the positions that are within the threshold distance from each other. The computer system can generate and store an association between the estimated position, the zone identifier, and the activity identifier in the data store. This is association is usable to provide a map of the zone indicating that the estimated position is a specific location where the activity can be completed.

In an example, the flow includes operation 1415, where the computer system does not generate the estimated position. By not doing so, no map showing the estimated position can be provided.

FIG. 15 illustrates an example of a flow for presenting a map including graphical user interface elements depicting an activity completion location, according to embodiments of the present disclosure. The map can merely show the zone if operation 1415 is performed in lieu of operation 1414 or can show the estimated position if operation 1414 is performed.

In an example, the flow includes operation 1502, where the computer system determines an activity and/or a zone in a video game that a video game player is currently playing. For instance, events are received from a computing device (e.g., a video game console) of the user and includes a activity identifier of the activity and/or a zone identifier of the zone.

In an example, the flow includes operation 1504, where the computer system determines that a map is available for the activity and/or the zone. For instance, the computer system the map based on a look up to a data store using the activity identifier and/or the zone identifier. The data store stores one or more associations between the activity identifier and/or the zone identifier with the map.

In an example, the flow includes operation 1506, where the computer system determines a current position of the video game player in the video game. For instance, the computer system receives the current position in an event from the computing device.

In an example, the flow includes operation 1508, where the computer system provides the map to the computing device of the user. In an illustration, the computer system updates the map to show the current position of the video game player as a graphical user interface element in the map. In another illustration, the computer system sends the map to the computing device that then updates it to show the current position. In both illustrations, the computing device presents the map on a display. The map can also show the estimated position for completing the activity (if available) as another graphical user interface element.

In an example, the flow includes operation 1510 alternatively to or preceding activity 1508. At operation 1510, the computer system suggests the activity. For instance, at operation 1502, the zone identifier is received but not the activity indicating that the video game player is in the zone but not playing the activity. The computer system can determine the distance difference between the current position of the video game player and the estimated completion position for completing the activity. Optionally, the computer system can also estimate a travel time from the current position to the estimated position. If the distance difference and/or the travel time are smaller than predefined threshold (s), the activity can be suggested to the video game player. Accordingly, the computer system sends, to the computing device for presentation on the display, suggesting information to identify the activity and, optionally, present the map showing the completion position.

Figure 16:
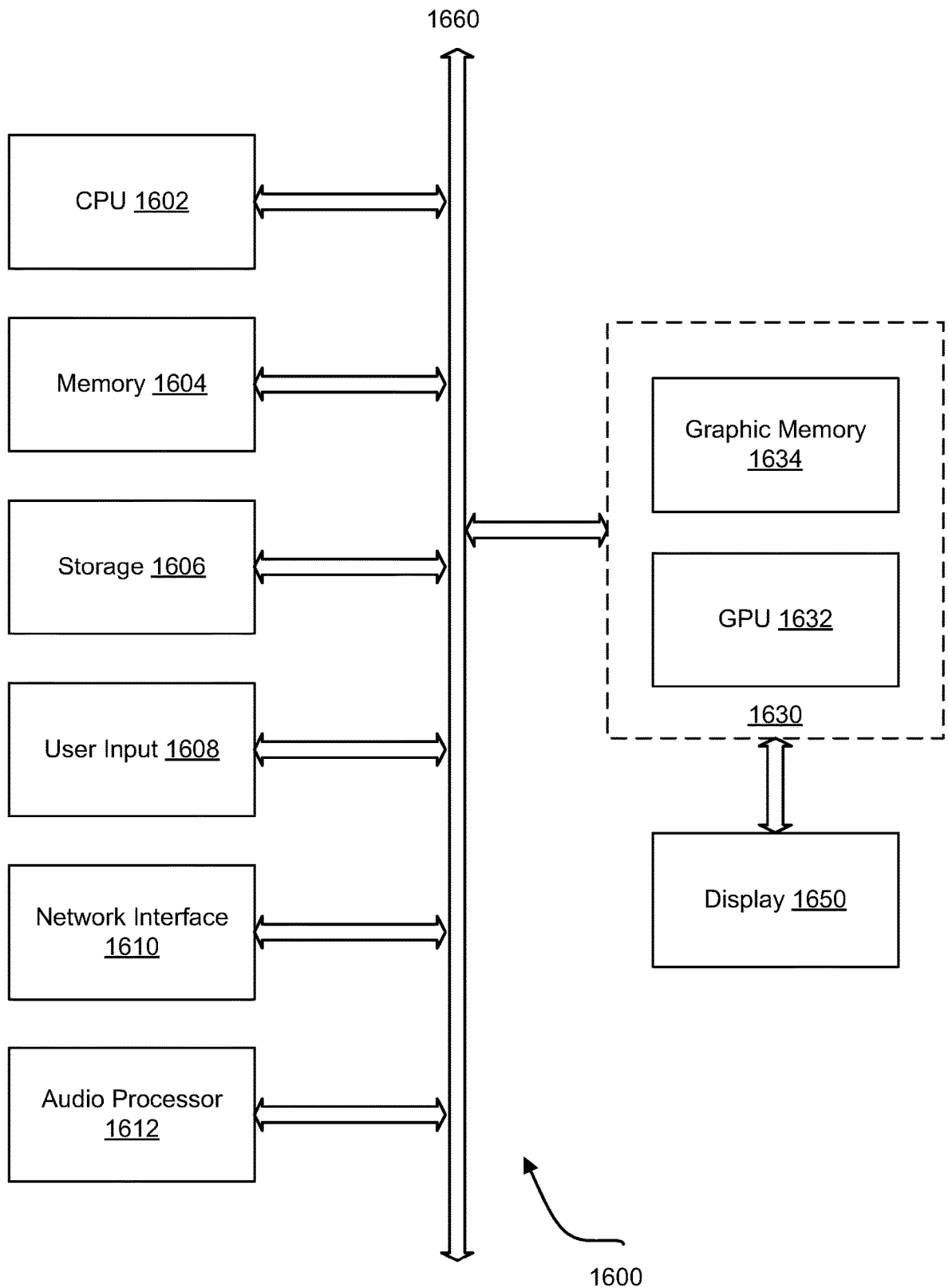
FIG. 16 illustrates an example of a hardware system suitable for implementing a computer system, according to embodiments of the present disclosure.

FIG. 16 illustrates an example of a hardware system suitable for implementing a computer system 1600, according to embodiments of the present disclosure. The computer system 1600 represents, for example, a video game console, a video game platform, or other types of a computer system. The computer system 1600 includes a central processing unit (CPU) 1602 for running software applications and optionally an operating system. The CPU 1602 may be made up of one or more homogeneous or heterogeneous processing cores. Memory 1604 stores applications and data for use by the CPU 1602. Storage 1606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1608 communicate user inputs from one or more users to the computer system 1600, examples of which may include keyboards, mice, joysticks, touch pads, touch screens, still or video cameras, and/or microphones. Network interface 1610 allows the computer system 1600 to communicate with other computer systems via an electronic communications network, and may include wired or wireless communication over local area networks and wide area networks such as the Internet. An audio processor 1612 is adapted to generate analog or digital audio output from instructions and/or data provided by the CPU 1602, memory 1604, and/or storage 1606. The components of computer system 1600, including the CPU 1602, memory 1604, data storage 1606, user input devices 1608, network interface 1610, and audio processor 1612 are connected via one or more data buses 1660.

A graphics subsystem 1630 is further connected with the data bus 1660 and the components of the computer system 1600. The graphics subsystem 1630 includes a graphics processing unit (GPU) 1632 and graphics memory 1634. The graphics memory 1634 includes a display memory (e.g., a frame buffer) used for storing pixel data for each pixel of an output image. The graphics memory 1634 can be integrated in the same device as the GPU 1632, connected as a separate device with the GPU 1632, and/or implemented within the memory 1604. Pixel data can be provided to the graphics memory 1634 directly from the CPU 1602. Alternatively, the CPU 1602 provides the GPU 1632 with data and/or instructions defining the desired output images, from which the GPU 1632 generates the pixel data of one or more output images. The data and/or instructions defining the desired output images can be stored in the memory 1604 and/or graphics memory 1634. In embodiments, the GPU 1632 includes 3D rendering capabilities for generating pixel data for output images from instructions and data defining the geometry, lighting, shading, texturing, motion, and/or camera parameters for a scene. The GPU 1632 can further include one or more programmable execution units capable of executing shader programs.

The graphics subsystem 1630 periodically outputs pixel data for an image from the graphics memory 1634 to be displayed on the display device 1650. The display device 1650 can be any device capable of displaying visual information in response to a signal from the computer system 1600, including CRT, LCD, plasma, and OLED displays. The computer system 1600 can provide the display device 1650 with an analog or digital signal.

In accordance with various embodiments, the CPU 1602 is one or more general-purpose microprocessors having one or more processing cores. Further embodiments can be implemented using one or more CPUs 1602 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process, which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented by a computer system, the method including:
   receiving an activity identifier of an activity completed by a first video game player in a video game and location information of a location within the video game where the activity was completed, wherein the activity identifier is predefined in program code of the video game, and wherein the activity identifier and the location information are received based on an execution of the program code;
   storing the activity identifier and the location information in a data store;
   determining, based on using the activity identifier and the location information in a look up of the data store, that a plurality of video game players completed the activity in the location;
   including a first graphical user interface element in a map that corresponds to the location, the first graphical user interface element including a heatmap of positions where the activity was completed in the location by the plurality of video game players; and
   presenting the map to a second video game player, the map showing the first graphical user interface element in the location.

2. The method of claim 1, wherein the location is a zone, and further including:
   receiving a first position within the zone of the first video game player at a time of completion of the activity by the first video game player;
   storing the first position in the data store; and
   determining, based on positions of the plurality of video game players stored in the data store, that the plurality of video game players completed the activity within a predefined threshold distance of each other.

3. The method of claim 2, further comprising:
   including a center of the positions where the activity was completed on the map.

4. The method of claim 1, further including:
   receiving an event indicating a completion of the activity by the first video game player, wherein the event includes an outcome of the activity and a first position within the location of the first video game player, wherein the outcome is one of a success or a failure;
   storing data from the event in the data store;
   determining, based on data stored in the data store from events received for the plurality of video game players, that the plurality of video game players completed the activity successfully within a predefined threshold distance of each other; and
   setting the first graphical user interface element in the map based on the positions of the plurality of video game players.

5. The method of claim 4, wherein the location is a zone, wherein the location information is a zone identifier of the zone, wherein the event further includes the activity identifier and the zone identifier.

6. The method of claim 1, wherein the map is presented in a window over a portion of video game content of the video game, wherein the video game content shows the location, and wherein the window includes an option to show the map adjacent to the video game content.

7. The method of claim 6, further including:
   receiving the activity identifier in association with the second video game player playing the video game;
   receiving a position of a virtual player within the video game content, the virtual player corresponding to the second video game player;
   including a second graphical user interface element in the map, the second graphical user interface element indicating the position on the map, wherein the map as presented further shows the second graphical user interface element in the location;
   receiving an updated position of the virtual player; and
   updating the presentation of the map by updating the second graphical user interface element to show the updated position and maintaining the first graphical user interface element.

8. The method of claim 6, the map is expanded and presented over the video game content upon a selection of the map in the window.

9. The method of claim 6, wherein the location is a zone, wherein the location information is a zone identifier of the zone, wherein the window further includes a link to a video associated with the activity identifier and the zone identifier.

10. The method of claim 9, wherein the video is played in the window upon a first selection of the link while the presentation of the map continues in the window.

11. The method of claim 10, wherein the video is presented over the video game content based on a second selection of the link.

12. The method of claim 6, wherein the location is a zone, wherein the location information is a zone identifier of the zone, wherein the window further includes information about using a mechanic to complete the activity, wherein the mechanic is associated with the activity identifier and the zone identifier.

13. The method of claim 12, wherein the information about using the mechanic includes at least one of: a text description, a link to a graphical animation, a link to a video file, or a link to an audio file.

14. A computer system including:
   one or more processors; and
   one or more memories storing computer-readable instructions that, upon execution by the one or more processors, configure the computer system to:
   receive an activity identifier of an activity completed by a first video game player in a video game and location information of a location within the video game where the activity was completed, wherein the activity identifier is predefined in program code of the video game, and wherein the activity identifier and the location information are received based on an execution of the program code;
   store the activity identifier and the location information in a data store;
   determine, based on using the activity identifier and the location information in a look up of the data store, that a plurality of video game players completed the activity in the location;

include a first graphical user interface element in a map that corresponds to the location, the first graphical user interface element including a heatmap of positions where the activity was completed in the location by the plurality of video game players; and
present the map to a second video game player, the map showing the first graphical user interface element in the location.

15. The computer system of claim 14, wherein the execution of the computer-readable instructions further configure the computer system to:
present video game content of the video game while the presentation of the map continues, wherein the video game content shows a graphical user interface object that includes a plurality of levels, wherein a location and the map correspond to one of the plurality of levels.

16. The computer system of claim 15, wherein the video game includes progress activities, open ended activities, and competitive activities, wherein the map is accessed based on the activity being one of the progress activities or the open ended activities.

17. One or more non-transitory computer-readable storage media storing instructions that, upon execution on a computer system, cause the computer system to perform operations including:
receiving an activity identifier of an activity completed by a first video game player in a video game and location information of a location within the video game where the activity was completed, wherein the activity identifier is predefined in program code of the video game, and wherein the activity identifier and the location information are received based on an execution of the program code;
storing the activity identifier and the location information in a data store;
determining, based on using the activity identifier and the location information in a look up of the data store, that a plurality of video game players completed the activity in the location;
including a first graphical user interface element in a map that corresponds to the location, the first graphical user interface element including a heatmap of positions where the activity was completed in the location by the plurality of video game players; and
presenting the map to a second video game player, the map showing the first graphical user interface element in the location.

18. The one or more non-transitory computer-readable storage media of claim 17, wherein the activity is a task from a plurality of tasks that form a second activity, wherein the operations further include:
presenting a window in a first state to the second video game player, the window identifying the second activity and presented over video content of the video game;
presenting the window in an expanded state upon a selection of the second activity, the window in the expanded state identifying the tasks of the second activity; and
updating the window in the expanded state to show the map upon a selection of the activity from the tasks.

19. The one or more non-transitory computer-readable storage media of claim 18, wherein a location is a zone, wherein the location information is a zone identifier of the zone, wherein the window is updated to further show a link to a video and information about using a mechanic to complete the activity, and wherein the link and the information are associated with the activity identifier and the zone identifier and are shown simultaneously with the map.

20. The one or more non-transitory computer-readable storage media of claim 17, wherein the location is a zone, and wherein the operations further include:
receiving a first position within the zone of the first video game player at a time of completion of the activity by the first video game player;
storing the first position in the data store; and
determining, based on positions of the plurality of video game players stored in the data store, that the plurality of video game players completed the activity within a predefined threshold distance of each other.

* * * * *